(12) United States Patent
Fujii et al.

(10) Patent No.: US 12,206,313 B2
(45) Date of Patent: Jan. 21, 2025

(54) ELECTRIC WORK MACHINE

(71) Applicant: MAKITA CORPORATION, Anjo (JP)

(72) Inventors: Fuminari Fujii, Anjo (JP); Yusuke Ichioka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 437 days.

(21) Appl. No.: 17/729,337

(22) Filed: Apr. 26, 2022

(65) Prior Publication Data
US 2022/0393544 A1 Dec. 8, 2022

(30) Foreign Application Priority Data

Jun. 3, 2021 (JP) .................................. 2021-093682
Dec. 21, 2021 (JP) .................................. 2021-207416

(51) Int. Cl.
| | |
|---|---|
| B27B 17/08 | (2006.01) |
| H02K 1/2706 | (2022.01) |
| H02K 3/34 | (2006.01) |
| H02K 5/16 | (2006.01) |
| H02K 5/22 | (2006.01) |
| H02K 9/06 | (2006.01) |
| H02K 21/02 | (2006.01) |
| H02K 5/08 | (2006.01) |

(52) U.S. Cl.
CPC ............. *H02K 5/225* (2013.01); *B27B 17/08* (2013.01); *H02K 1/2706* (2013.01); *H02K 3/345* (2013.01); *H02K 5/163* (2013.01); *H02K 9/06* (2013.01); *H02K 21/02* (2013.01); *H02K 5/08* (2013.01)

(58) Field of Classification Search
CPC ...... H02K 1/2706; H02K 3/345; H02K 5/163; H02K 21/02; B27B 17/08
See application file for complete search history.

(56) References Cited

U.S. PATENT DOCUMENTS

| | | |
|---|---|---|
| 6,809,263 B2 | 10/2004 | Jackson |
| 9,656,336 B2 | 5/2017 | Petersson et al. |
| 2010/0083513 A1 | 4/2010 | Pellenc |
| 2012/0104983 A1 | 5/2012 | Tanimoto et al. |
| 2018/0266440 A1 | 9/2018 | Shiozawa |
| 2019/0273421 A1 | 9/2019 | Velderman et al. |

FOREIGN PATENT DOCUMENTS

| | | | |
|---|---|---|---|
| EP | 3 534 504 A1 | 9/2019 | |
| JP | 2008-259383 A | 10/2008 | |
| JP | 5418119 B2 | 2/2014 | |
| JP | 5482274 B2 | 5/2014 | |
| JP | 5952346 B2 | 7/2016 | |
| JP | 2018-155237 A | 10/2018 | |
| WO | WO-2021065273 A1 * | 4/2021 | ............. B25F 5/008 |

* cited by examiner

*Primary Examiner* — Jue Zhang
(74) *Attorney, Agent, or Firm* — Oliff PLC

(57) ABSTRACT

A brushless motor is at least partially located in a hermetically sealed space. An electric work machine includes a brushless motor, an output unit, a motor case, a lead wire, and a first seal. The brushless motor includes a stator, a rotor rotatable with respect to the stator, and a rotor shaft fixed to the rotor. The output unit is drivable by the rotor shaft. The motor case includes an internal space and a wiring passage. The internal space accommodates the stator and the rotor. The lead wire is located in the wiring passage connecting the internal space and an external space of the motor case. The first seal seals between the lead wire and the motor case.

22 Claims, 30 Drawing Sheets

ELECTRIC WORK MACHINE

CROSS-REFERENCE TO RELATED APPLICATIONS

This application claims the benefit of priority to Japanese Patent Application No. 2021-093682, filed on Jun. 3, 2021, and Japanese Patent Application No. 2021-207416, filed on Dec. 21, 2021, the entire contents of which are hereby incorporated by reference.

BACKGROUND

1. Technical Field

The present disclosure relates to an electric work machine.

2. Description of the Background

Cable gland assemblies are known, as disclosed in U.S. Pat. No. 6,809,263.

BRIEF SUMMARY

An electric work machine includes a brushless motor as a power source. The brushless motor may be at least partially located in a hermetically sealed space, depending on the specifications of the electric work machine.

One or more aspects of the present disclosure are directed to a structure including a brushless motor at least partially located in a hermetically sealed space.

A first aspect of the present disclosure provides an electric work machine, including:
a brushless motor including
  a stator,
  a rotor rotatable with respect to the stator, and
  a rotor shaft fixed to the rotor;
an output unit drivable by the rotor shaft;
a motor case including an internal space and a wiring passage, the internal space accommodating the stator and the rotor;
a lead wire located in the wiring passage connecting the internal space and an external space of the motor case; and
a first seal sealing between the lead wire and the motor case.

A second aspect of the present disclosure provides an electric work machine, including:
a brushless motor including
  a stator,
  a rotor rotatable with respect to the stator, and
  a rotor shaft fixed to the rotor;
an output unit drivable by the rotor shaft;
a motor case including an internal space and a wiring passage, the internal space accommodating the stator and the rotor;
a collective tube located in the wiring passage connecting the internal space and an external space of the motor case, the collective tube integrally bundling a plurality of lead wires; and
a first seal sealing between the collective tube and the motor case.

A third aspect of the present disclosure provides an electric work machine, including:
a brushless motor including
  a stator,
  a rotor rotatable with respect to the stator, and
  a rotor shaft fixed to the rotor;
an output unit drivable by the rotor shaft;
a motor case including an internal space and a wiring passage, the internal space accommodating the stator and the rotor;
a sensor in the internal space;
a signal line connected to the sensor and located in the wiring passage connecting the internal space and an external space of the motor case; and
a first seal sealing between the signal line and the motor case.

The structure according to the above aspects of the present disclosure includes the brushless motor at least partially located in a hermetically sealed space.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear, and up and down (or vertical). The terms indicate relative positions or directions with respect to the center of an electric work machine.

The electric work machine includes a motor. In the embodiments, a direction parallel to a rotation axis AX of the motor is referred to as an axial direction for convenience. A direction radial with respect to the rotation axis AX of the motor is referred to as a radial direction or radially for convenience. A direction about the rotation axis AX of the motor is referred to as a circumferential direction, circumferentially, or a rotation direction for convenience.

A position nearer the center of the motor in the axial direction, or an axial direction toward the center of the motor, is referred to as axially inward for convenience. A position farther from the center of the motor in the axial direction, or an axial direction away from the center of the motor, is referred to as axially outward for convenience. A position nearer the rotation axis AX of the motor in the radial direction, or a radial direction toward the rotation axis AX, is referred to as radially inward for convenience. A position farther from the rotation axis AX of the motor in the radial direction, or a radial direction away from the rotation axis AX of the motor, is referred to as radially outside or radially outward for convenience. A position in one circumferential direction, or one circumferential direction, is referred to as a first circumferential direction for convenience. A position in the other circumferential direction, or the other circumferential direction, is referred to as a second circumferential direction for convenience.

First Embodiment

A first embodiment will now be described.
Electric Work Machine

Figure 1:
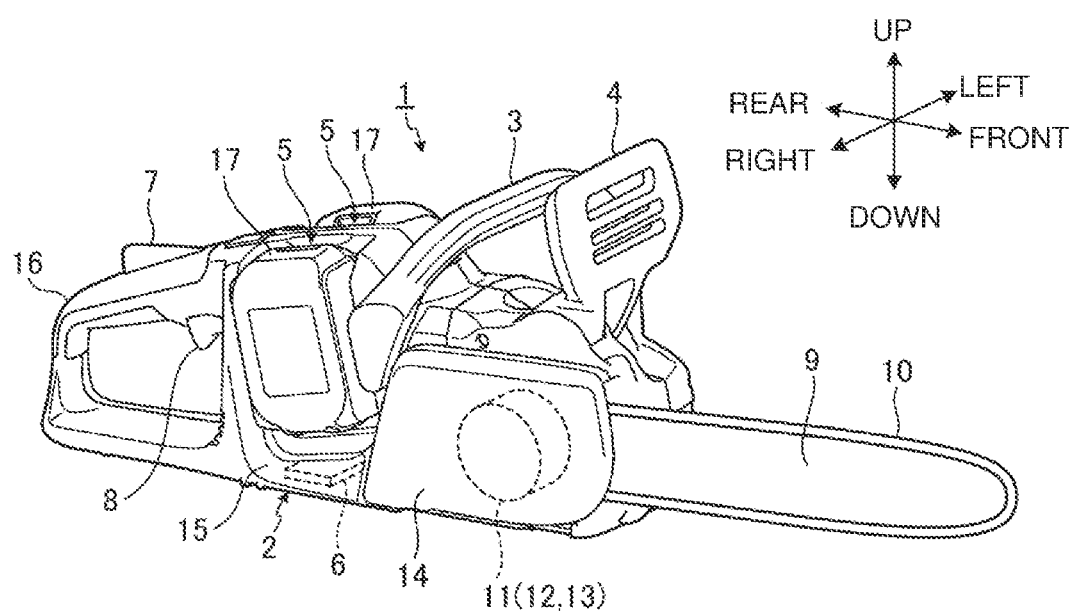
FIG. 1 is a perspective view of an electric work machine according to a first embodiment.

FIG. 1 is a perspective view of an electric work machine 1 according to the embodiment. The electric work machine 1 according to the present embodiment is a chain saw as an example of outdoor power equipment.

The electric work machine 1 includes a housing 2, a front grip 3, a hand guard 4, a battery mount 5, a controller 6, a trigger lock lever 7, a trigger switch 8, a guide bar 9, a saw chain 10, and a motor assembly 11. The motor assembly 11 includes a motor 12 and a motor case 13.

The housing 2 is formed from a synthetic resin. The housing 2 includes a motor compartment 14, a battery holder 15, and a rear grip 16.

The motor compartment 14 accommodates the motor assembly 11.

The battery holder 15 supports the battery mount 5. The battery holder 15 is connected to a rear end of the motor compartment 14.

The rear grip 16 is grippable by a hand of an operator of the electric work machine 1. The rear grip 16 is connected to a rear end of the battery holder 15. A portion of the rear grip 16 is connected to an upper portion of the rear end of the battery holder 15. Another portion of the rear grip 16 is connected to a lower portion of the rear end of the battery holder 15.

The front grip 3 is grippable by a hand of the operator of the electric work machine 1. The front grip 3 is formed from a synthetic resin. The front grip 3 is a pipe. The front grip 3 is connected to the battery holder 15. The front grip 3 has a left end connected to a left side surface of the battery holder 15, and a right end connected to a right side surface of the battery holder 15.

The hand guard 4 protects the hand of the operator holding the front grip 3. The hand guard 4 is located in front of the front grip 3. The hand guard 4 is connected to an upper portion of the motor compartment 14.

A battery pack 17 is attached to the battery mount 5. The battery pack 17 is detachable from the battery mount 5. The battery pack 17 may include a secondary battery. The battery pack 17 in the embodiment includes a rechargeable lithium-ion battery. The battery pack 17 functions as a power supply for the electric work machine 1. The battery pack 17 is attached to the battery mount 5 to power the electric work machine 1.

The controller 6 is accommodated in the battery holder 15. The controller 6 outputs control signals for controlling the electric work machine 1. The controller 6 controls a drive current supplied from the battery pack 17 to the motor 12.

The trigger lock lever 7 is located on the rear grip 16. The operator of the electric work machine 1 operates the trigger lock lever 7. This causes the trigger switch 8 to be operable.

The trigger switch 8 is located on the rear grip 16. The operator of the electric work machine 1 holding the rear grip 16 with a hand operates the trigger switch 8 with a finger. A drive current is supplied to the motor 12 to drive the motor 12.

The guide bar 9 extends frontward from the housing 2. The guide bar 9 is a plate elongated in the front-back direction.

The saw chain 10 functions as an output unit of the electric work machine 1 driven by the motor 12. The saw chain 10 includes multiple cutters that are connected to one another. The saw chain 10 is located along the peripheral edge of the guide bar 9. The motor 12 and the saw chain 10 are connected with a power transmission assembly (not shown) including a sprocket. In response to the trigger switch 8 being operated to rotate the motor 12, the saw chain 10 moves along the peripheral edge of the guide bar 9.

Motor Assembly

Figure 2:
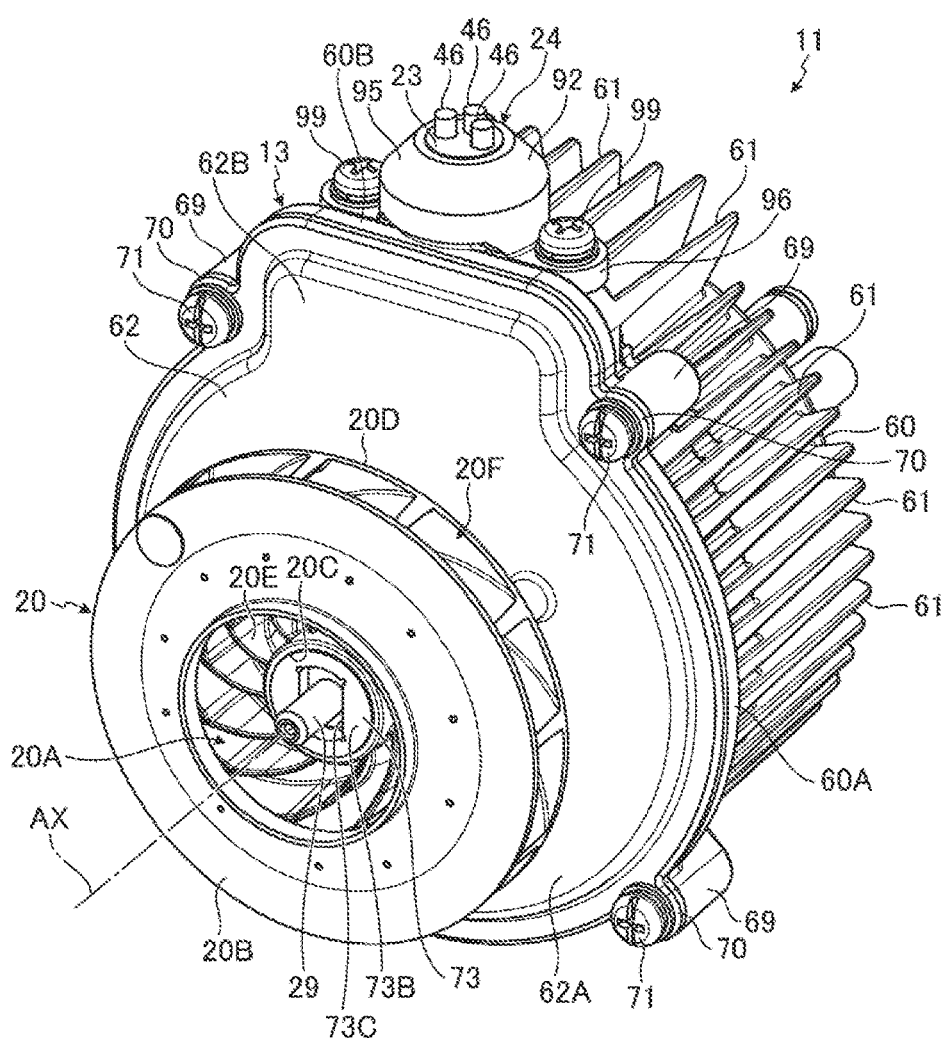
FIG. 2 is a right perspective view of a motor assembly in the first embodiment.
Figure 2:
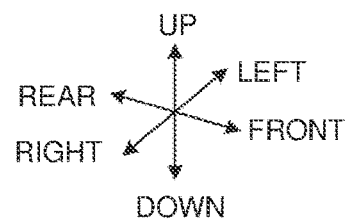
Figure 3:
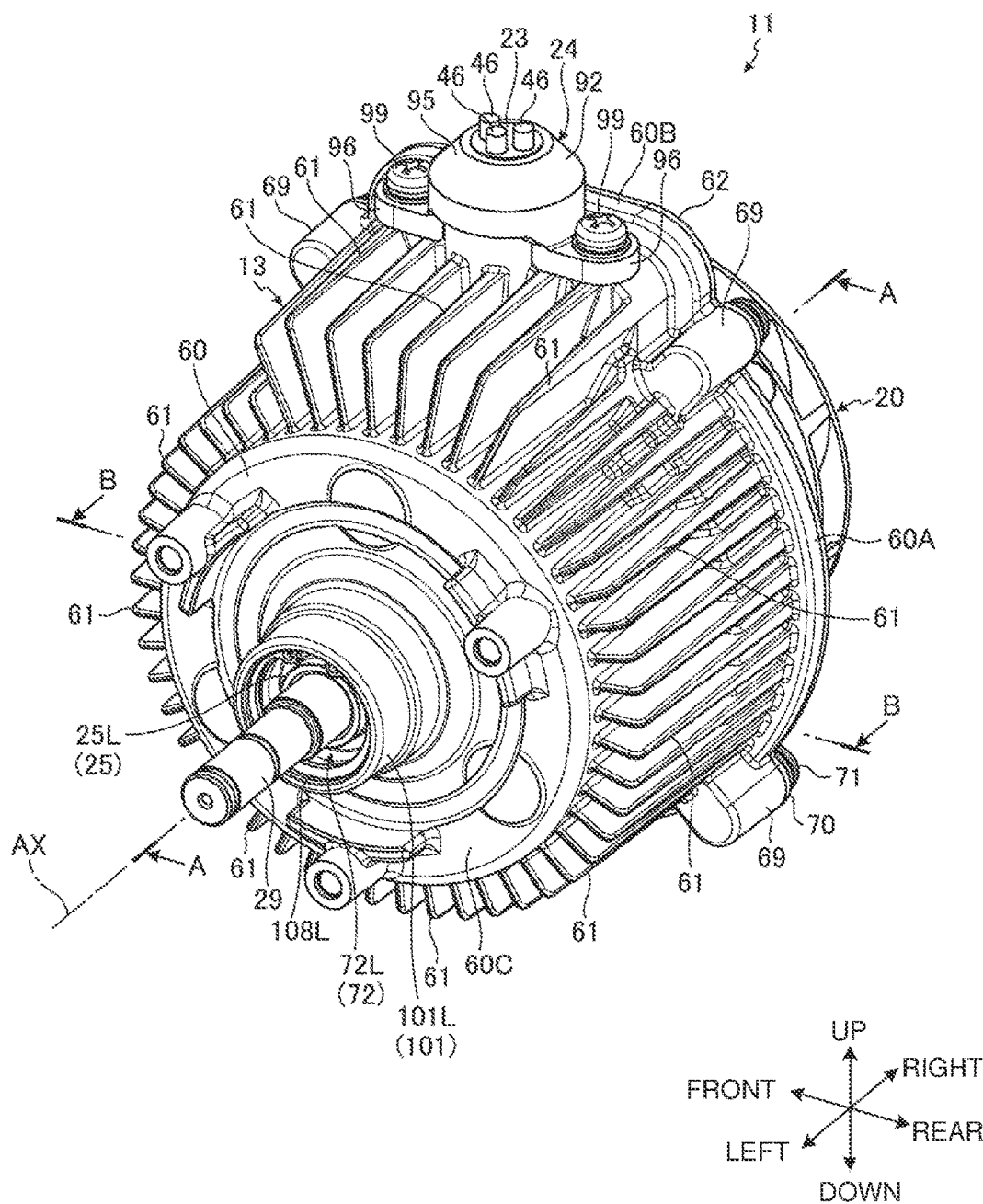
FIG. 3 is a left perspective view of the motor assembly in the first embodiment.
Figure 4:
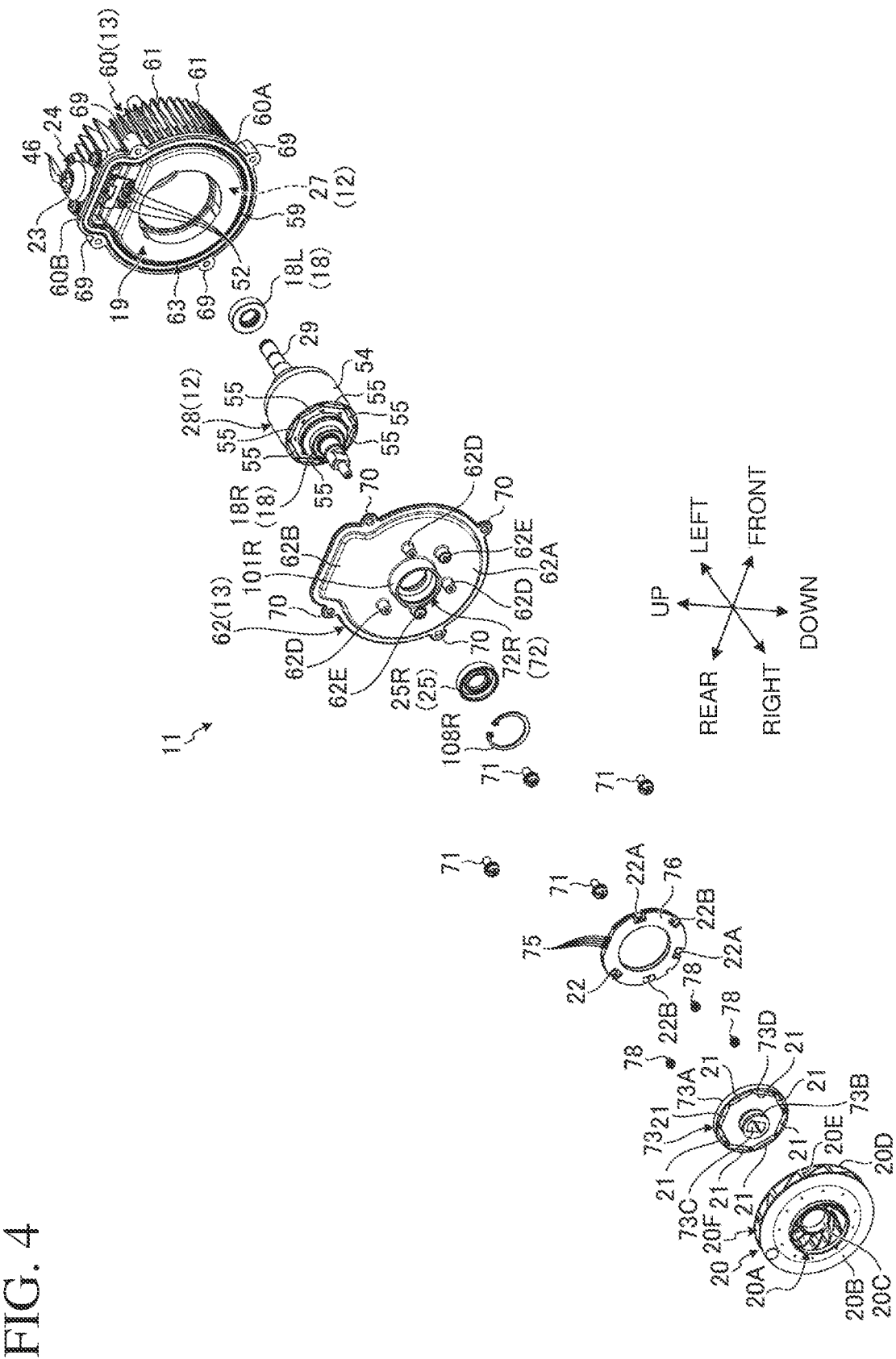
FIG. 4 is an exploded right perspective view of the motor assembly in the first embodiment.
Figure 5:
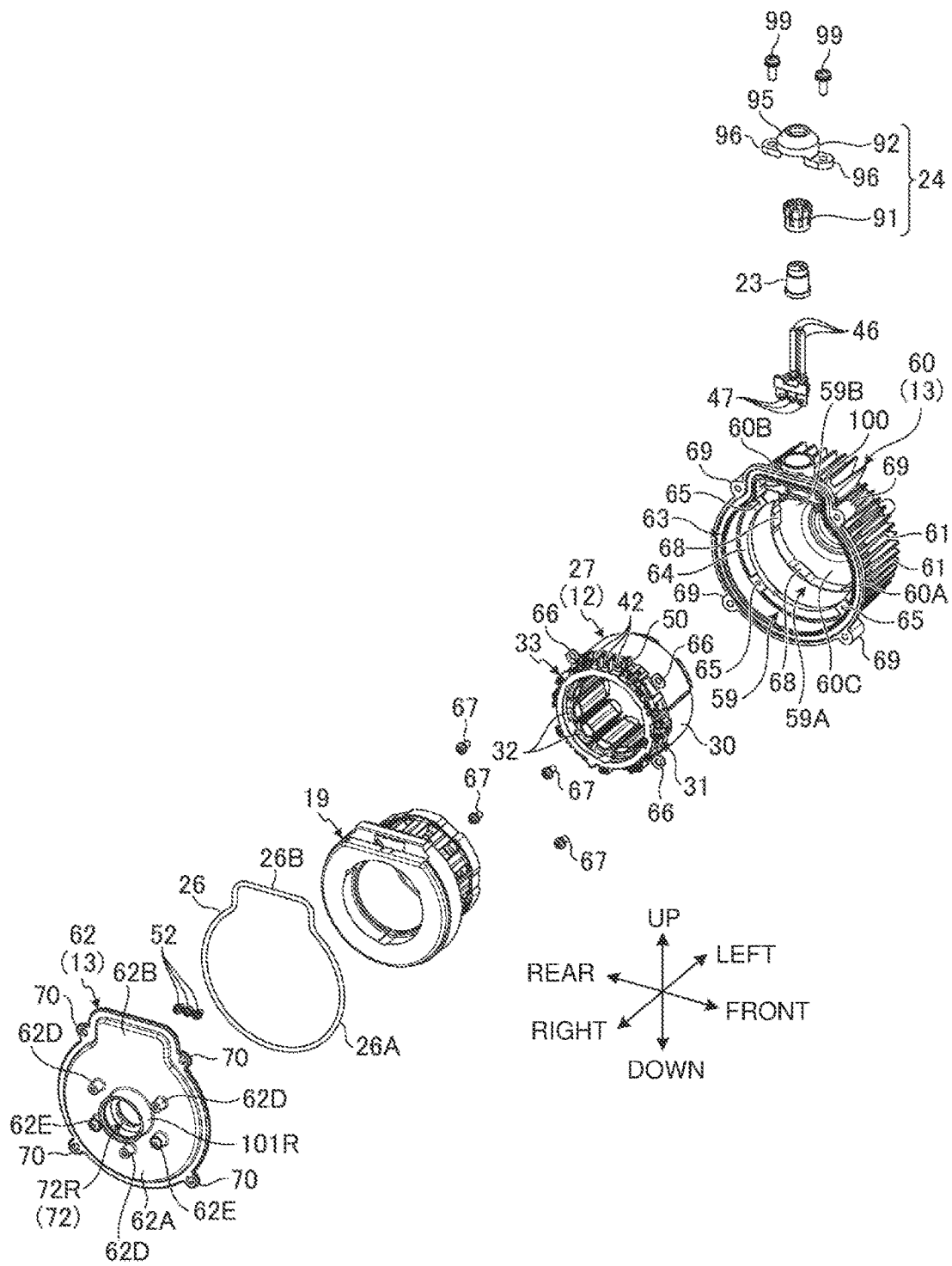
FIG. 5 is an exploded right perspective view of a motor and a motor case in the first embodiment.
Figure 6:
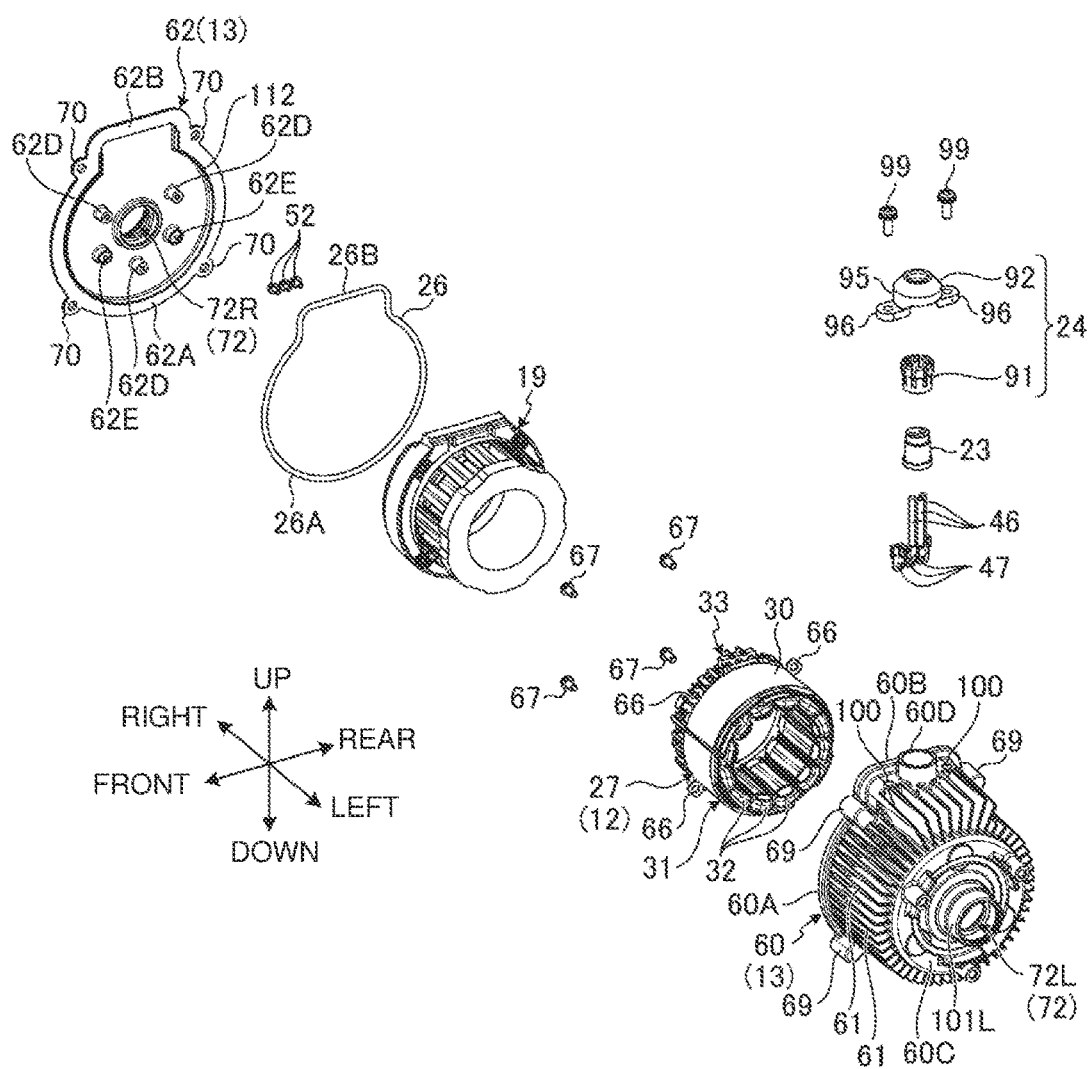
FIG. 6 is an exploded left perspective view of the motor and the motor case in the first embodiment.
Figure 7:
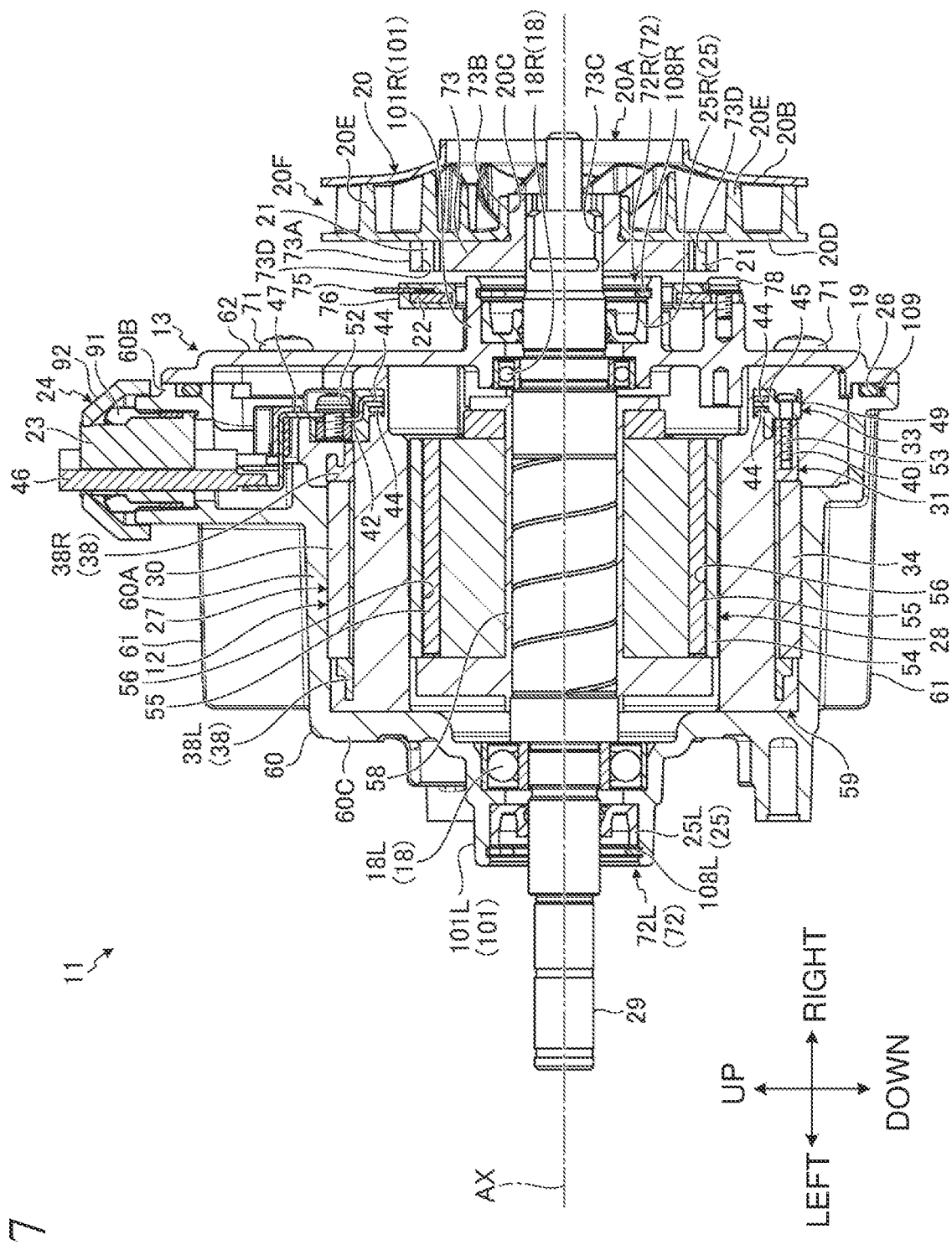
FIG. 7 is a longitudinal sectional view of the motor assembly in the first embodiment.
Figure 8:
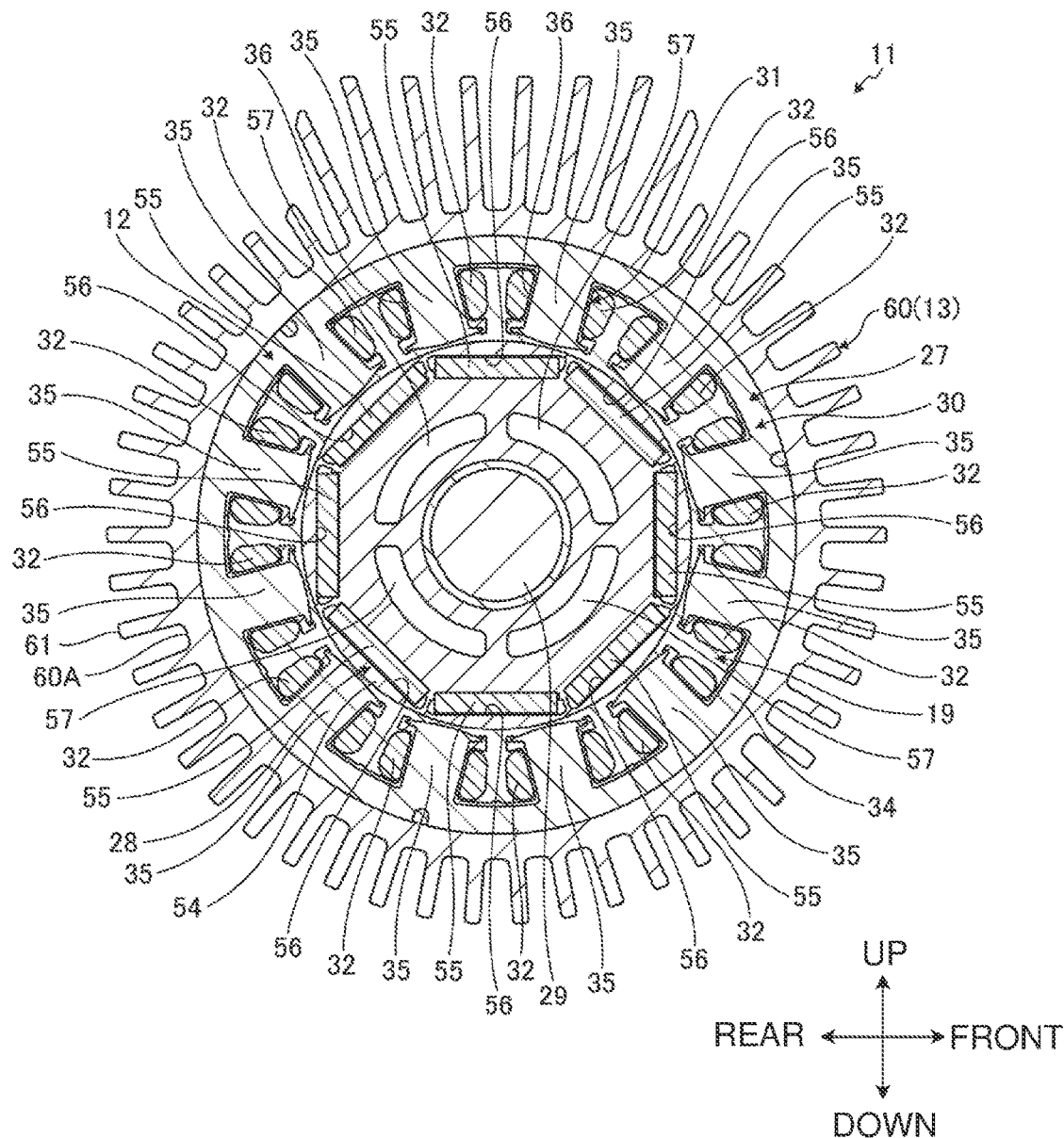
FIG. 8 is a cross-sectional view of the motor assembly in the first embodiment.

FIG. 2 is a right perspective view of the motor assembly 11 in the embodiment. FIG. 3 is a left perspective view of the motor assembly 11 in the embodiment. FIG. 4 is an exploded right perspective view of the motor assembly 11 in the embodiment. FIG. 5 is an exploded right perspective view of the motor 12 and the motor case 13 in the embodiment. FIG. 6 is an exploded left perspective view of the motor 12 and the motor case 13 in the embodiment. FIG. 7 is a longitudinal sectional view of the motor assembly 11 in the embodiment, taken along line A-A in FIG. 3 as viewed in the direction indicated by arrows. FIG. 8 is a cross-sectional view of the motor assembly 11 in the embodiment, taken along line B-B in FIG. 3 as viewed in the direction indicated by arrows.

The motor assembly 11 includes the motor 12, the motor case 13, bearings 18, a heat transfer resin portion 19, a cooling fan 20, sensor magnets 21, a sensor board 22, a first seal 23, a press assembly 24, second seals 25, and a third seal 26.

Motor

The motor 12 is a power source for the electric work machine 1. The motor 12 rotates on a drive current supplied from the battery pack 17.

The motor 12 is a brushless inner-rotor motor. The motor 12 includes a stator 27, a rotor 28, and a rotor shaft 29. The rotor 28 rotates relative to the stator 27. The rotor shaft 29 is fixed to the rotor 28. The stator 27 surrounds at least a part of the rotor 28. The rotor 28 rotates about the rotation axis AX. The saw chain 10 is driven by the rotor shaft 29.

In the embodiment, the rotation axis AX of the motor 12 extends in the lateral direction. The axial direction and the lateral direction are parallel to each other. Hereafter, a first axial direction is referred to as the left, and a second axial direction opposite to the first axial direction is referred to as the right for convenience.

Figure 9:
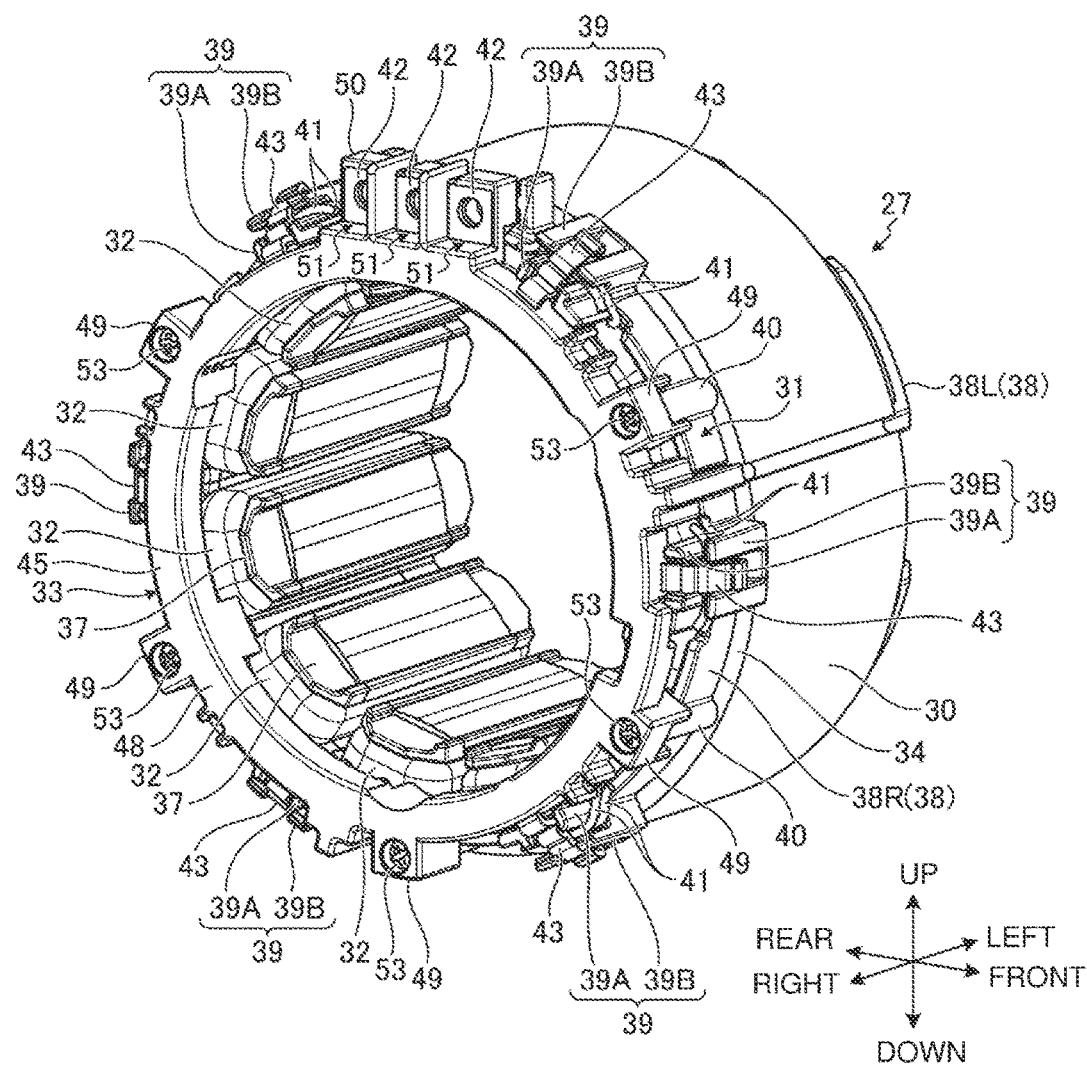
FIG. 9 is a right perspective view of a stator in the first embodiment.

FIG. 9 is a right perspective view of the stator 27 in the embodiment. As shown in FIGS. 4 to 9, the stator 27 includes a stator core 30, an insulator 31, coils 32, and a busbar unit 33.

The stator core 30 includes multiple steel plates stacked on one another. The steel plates are iron-based metal plates. The stator core 30 includes an annular yoke 34 and teeth 35. The teeth 35 protrude radially inward from the inner surface of the yoke 34. The yoke 34 surrounds the rotation axis AX. Multiple (12 in the present embodiment) teeth 35 are located at circumferentially equal intervals.

The insulator 31 covers at least a part of the surface of the stator core 30. The insulator 31 is formed from a synthetic resin. The insulator 31 is fixed to the stator core 30. The insulator 31 is integrally molded with the stator core 30. The insulator 31 is fixed to the stator core 30 by insert molding.

The insulator 31 includes tooth covers 36, coil stops 37, peripheral walls 38, wire supports 39, and screw bosses 40.

As shown in FIG. 8, the tooth covers 36 cover the outer surfaces of the teeth 35. The inner wall surfaces of the teeth 35 facing radially inward are not covered by the tooth covers 36. The inner wall surfaces of the teeth 35 are exposed.

As shown in FIG. 9, the coil stops 37 surround the inner wall surfaces of the teeth 35. The coil stops 37 are connected to the inner ends of the respective tooth covers 36 that are located radially inward. Each coil stop 37 at least partially protrudes axially outward from the outer peripheral surface of the corresponding teeth 35.

The peripheral walls 38 are located on the axial end faces of the yoke 34. The peripheral walls 38 are connected to the outer ends of the tooth covers 36, which are located radially outward. The peripheral walls 38 protrude axially outward from the end faces of the yoke 34. As shown in FIGS. 7 and 9, the peripheral walls 38 include a peripheral wall 38L and a peripheral wall 38R. The peripheral wall 38L is located on the left end face of the yoke 34. The peripheral wall 38R is located on the right end face of the yoke 34.

The wire supports 39 are located on the peripheral wall 38R. The insulator 31 includes the multiple wire supports 39. The wire supports 39 are located radially outward from the coils 32. Each wire support 39 includes an inner protrusion 39A and an outer protrusion 39B. The outer protrusion 39B is located radially outward from the inner protrusion 39A. The inner protrusion 39A and the outer protrusion 39B protrude rightward from the peripheral wall 38R.

The screw bosses 40 are located on the peripheral wall 38R. Multiple (five in the present embodiment) screw bosses 40 are located at intervals about the rotation axis AX. Each screw boss 40 has a threaded hole.

The coils 32 are attached to the insulator 31. The coils 32 are fixed to the insulator 31. Each coil 32 and the stator core 30 are insulated from each other by the insulator 31. The coils 32 are wound around the teeth 35 with the tooth covers 36 of the insulator 31 between them. The stator 27 includes multiple (12 in the present embodiment) coils 32.

In the radial direction, a part of each coil 32 is located between the corresponding coil stop 37 and peripheral wall 38. With the coil 32 wound around the corresponding tooth cover 36, the coil stop 37 is located radially inward from the coil 32. The coil stop 37 faces the radially inner end face of the coil 32. With the coil 32 wound around the tooth cover 36, the corresponding peripheral wall 38 is located radially outward from the coil 32. The peripheral wall 38 faces the radially outer end face of the coil 32.

The multiple coils 32 are formed by winding wires 41. The coils 32 located circumferentially adjacent to each other are connected by the wires 41 protruding from the coils 32. The wires 41 protruding from the coils 32 are supported by the insulator 31.

The wires 41 protruding from the coils 32 are supported by the wire supports 39 of the insulator 31. The wires 41 protruding from the coils 32 are located between the inner protrusions 39A and the outer protrusions 39B.

The busbar unit 33 is fixed to the insulator 31. A drive current from the battery pack 17 is supplied to the busbar unit 33 through the controller 6. The controller 6 controls the drive current supplied from the battery pack 17 to the busbar unit 33.

Figure 10:
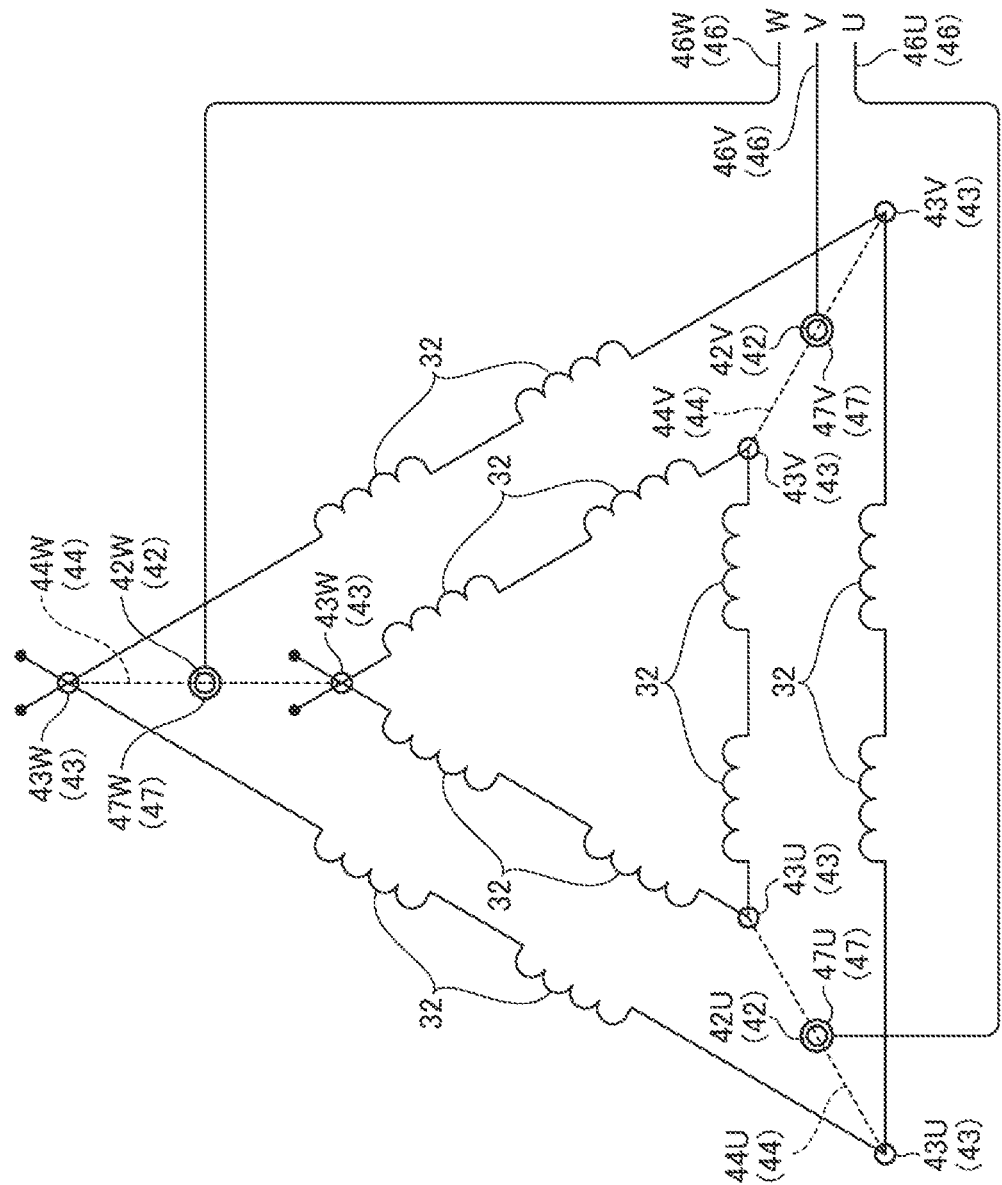
FIG. 10 is a schematic diagram of coils in the first embodiment, describing the wiring structure.

FIG. 10 is a schematic diagram of the coils 32 in the embodiment, describing the wiring structure. As shown in FIGS. 7, 9, and 10, the busbar unit 33 includes external terminals 42, fusing terminals 43, short-circuiting members 44, and an insulating member 45.

The external terminals 42 are connected to the battery pack 17 through the controller 6. A drive current from the battery pack 17 is supplied to the external terminals 42 through power lines 46 and connector terminals 47. The busbar unit 33 in the embodiment includes three external terminals 42.

The fusing terminals 43 are connected to the wires 41 protruding from the coils 32. The fusing terminals 43 conduct electricity. The wires 41 protruding from the coils 32, which are supported by the wire supports 39 of the insulator 31, are connected to the fusing terminals 43. The wire 41 protruding from each coil 32 is placed in a bent portion of the corresponding fusing terminal 43. The fusing terminal 43 and the wire 41 protruding from the corresponding coil 32 are welded together. The fusing terminal 43 is thus connected to the coil 32 through the wire 41.

Multiple (six in the present embodiment) fusing terminals 43 surround the rotation axis AX. The fusing terminals 43 are at the same position in the axial direction.

Each short-circuiting member 44 connects (short-circuits) a pair of wires 41 that radially face each other. The pair of wires 41 radially facing each other are 180° apart from each other in the circumferential direction. Each short-circuiting member 44 connects the corresponding external terminal 42 and the corresponding fusing terminals 43. The short-circuiting members 44 conduct electricity. Each short-circuiting member 44 is curved in a plane orthogonal to the rotation axis AX. The busbar unit 33 includes multiple (three in the present embodiment) short-circuiting members 44. Each short-circuiting member 44 connects (short-circuits) one external terminal 42 and two fusing terminals 43.

The insulating member 45 is formed from a synthetic resin. The insulating member 45 surrounds the rotation axis AX. The short-circuiting members 44 are located inside the insulating member 45. FIG. 9 does not show the short-circuiting members 44. The insulating member 45 supports the external terminals 42 and the short-circuiting members 44. The insulating member 45 supports the fusing terminals 43 with the short-circuiting members 44 in between. The insulating member 45 includes a base 48, screw bosses 49, and a connector 50.

The base 48 is annular. Each short-circuiting member 44 is at least partially inside the base 48. The base 48 is integrally molded with the short-circuiting members 44. The short-circuiting members 44 are molded with a synthetic resin used for the base 48. The base 48 may be fixed to the short-circuiting members 44 by, for example, insert molding. The base 48 insulates the three short-circuiting members 44 from one another.

The screw bosses 49 protrude radially outward from the outer edge of the base 48. The insulating member 45 includes multiple (five in the present embodiment) screw bosses 49 in the circumferential direction. Each screw boss 49 has an opening.

The connector 50 protrudes upward from an upper portion of the base 48. The connector 50 has three recesses 51. Each recess 51 receives the corresponding external terminal 42. In the connector 50, each external terminal 42 and the corresponding connector terminal 47 are fastened with a screw 52.

A drive current from the battery pack 17 is supplied to the external terminals 42 of the busbar unit 33 through the controller 6, the power lines 46, and the connector terminals 47. The drive current supplied from the battery pack 17 to the external terminals 42 flows through the short-circuiting members 44 and the fusing terminals 43 and is then supplied to the coils 32 through the wires 41 protruding from the coils 32.

In the embodiment, a drive current supplied from the battery pack 17 to the motor 12 includes a U-phase drive current, a V-phase drive current, and a W-phase drive current. The power lines 46 include a power line 46U, a power line 46V, and a power line 46W.

The U-phase drive current flows through the power line 46U. The V-phase drive current flows through the power line 46V The W-phase drive current flows through the power line 46W.

The connector terminals 47 include connector terminals 47U, 47V, and 47W. The connector terminal 47U is connected to the power line 46U. The connector terminal 47V is connected to the power line 46V. The connector terminal 47W is connected to the power line 46W.

The external terminals 42 include external terminals 42U, 42V, and 42W. The external terminal 42U is connected to the connector terminal 47U. The external terminal 42V is connected to the connector terminal 47V. The external terminal 42W is connected to the connector terminal 47W.

The short-circuiting members 44 include a short-circuiting member 44U, a short-circuiting member 44V, and a short-circuiting member 44W. The short-circuiting member 44U is connected to the external terminal 42U. The short-circuiting member 44V is connected to the external terminal 42V. The short-circuiting member 44W is connected to the external terminal 42W.

The fusing terminals 43 include a pair of fusing terminals 43U, a pair of fusing terminals 43V, and a pair of fusing terminals 43W. The pair of fusing terminals 43U are connected to the short-circuiting member 44U. The pair of fusing terminals 43V are connected to the short-circuiting member 44V. The pair of fusing terminals 43W are connected to the short-circuiting member 44W.

The short-circuiting member 44U connects the external terminal 42U and the pair of fusing terminals 43U. The short-circuiting member 44V connects the external terminal 42V and the pair of fusing terminals 43V. The short-circuiting member 44W connects the external terminal 42W and the pair of fusing terminals 43W.

The external terminal 42U, the fusing terminals 43U, and the short-circuiting member 44U are integral with one another. The external terminal 42V, the fusing terminals 43V, and the short-circuiting member 44V are integral with one another. The external terminal 42W, the fusing terminals 43W, and the short-circuiting member 44W are integral with one another.

Each of the twelve coils 32 is assigned to one of a U-(U-V) phase, a V-(V-W) phase, and a W-(W-U) phase. The coils 32 that are connected to the fusing terminals 43U through the wires 41 are assigned to the U-phase coils. The coils 32 that are connected to the fusing terminals 43V through the wires 41 are assigned to the V-phase coils. The coils 32 that are connected to the fusing terminals 43W through the wires 41 are assigned to the W-phase coils.

The insulator 31 and the busbar unit 33 are fastened with screws 53. Each screw 53 has its distal end fastened into the threaded hole of the corresponding screw boss 49 with the middle portion of the screw 53 received in an opening of the corresponding screw boss 40. The insulator 31 and the busbar unit 33 are thus fastened with the screws 53.

As shown in FIGS. 4, 7, and 8, the rotor 28 includes a rotor core 54 and rotation magnets 55.

The rotor core 54 includes multiple steel plates stacked on one another. The steel plates are iron-based metal plates. The rotor core 54 surrounds the rotation axis AX. The stator core 30 surrounds the rotor core 54.

The rotation magnets 55 are permanent magnets. The rotation magnets 55 are supported by the rotor core 54. The rotation magnets 55 are located inside the rotor core 54. Multiple rotation magnets 55 surround the rotation axis AX.

The rotor core 54 has multiple magnet slots 56. The multiple (eight in the present embodiment) magnet slots 56 are located circumferentially at intervals. The magnet slots 56 extend through the right and left end faces of the rotor core 54. Each rotation magnet 55 is received in the corresponding magnet slot 56.

The rotor core 54 in the embodiment has multiple (four in the present embodiment) hollow portions 57. The hollow portions 57 are located circumferentially at intervals. The hollow portions 57 extend through the right and the left end faces of the rotor core 54. The hollow portions 57 are located radially inward from the magnet slots 56. The hollow portions 57 reduce the weight of the rotor core 54.

The rotor shaft 29 extends in the axial direction. The central axis of the rotor shaft 29 is aligned with the rotation axis AX. The rotor shaft 29 is located inside the rotor core 54. The rotor core 54 is fixed to the rotor shaft 29. In the embodiment, as shown in FIG. 7, a cylindrical member 58 surrounds the rotor shaft 29. The rotor shaft 29 is fixed to the rotor core 54 with the cylindrical member 58 in between.

The rotor shaft 29 has a left portion protruding leftward from the left end face of the rotor core 54, and has a right portion protruding rightward from the right end face of the rotor core 54.

A drive current is supplied to the coils 32 from the battery pack 17 through the controller 6 to generate a rotating magnetic field in the stator 27. This rotates the rotor 28 with the rotation magnets 55.

Motor Case

The motor case 13 accommodates at least apart of the motor 12. The motor case 13 in the embodiment accommodates the stator 27 and the rotor 28. The motor case 13 has an internal space 59 accommodating the stator 27 and the rotor 28. The stator 27 surrounds at least a part of the rotor 28 in the internal space 59 of the motor case 13. The internal space 59 is closed. The internal space 59 in the embodiment is sealed substantially hermetically. The rotor shaft 29 is partially located in the internal space 59.

The motor case 13 in the embodiment includes a body 60, heat-radiating fins 61, and a lid 62.

The body 60 accommodates the stator 27 and the rotor 28. The stator 27 and the rotor 28 are located inside the body 60. The body 60 has an insertion hole 63 to receive the stator 27.

The heat-radiating fins 61 are located on the outer surface of the body 60. The outer surface of the body 60 surrounds the rotation axis AX. The heat-radiating fins 61 extend axially on the outer surface of the body 60. Multiple heat-radiating fins 61 are located circumferentially at intervals.

The lid 62 covers the insertion hole 63 of the body 60. The body 60 and the lid 62 are connected to cover the insertion hole 63 with the lid 62 to define the internal space 59 between the body 60 and the lid 62. At least a part of the motor 12 including the stator 27 is placed inside the body 60, and then the insertion hole 63 of the body 60 is covered with the lid 62. Thus, the motor 12 is at least partially located in the internal space 59.

As shown in FIG. 5, the body 60 has a support surface 64 on its inner surface. The support surface 64 faces rightward. The support surface 64 is annular and surrounds the rotation axis AX. The support surface 64 has four threaded holes 65 circumferentially at intervals. A screw 67 is fastened through a washer 66 into the corresponding threaded hole 65 with at least a part of the washer 66 in contact with the right end face of the stator core 30. Each washer 66 is at least partially located radially inward from the support surface 64. The contact between the stator core 30 and each washer 66 positions the stator 27 and the body 60 in the axial and circumferential directions.

The body 60 includes multiple ridges 68 on its inner surface. Each ridge 68 protrudes radially inward from the inner surface of the body 60. The ridges 68 are located circumferentially at intervals. The contact between the outer surface of the stator core 30 and each ridge 68 positions the stator 27 and the body 60 in the axial and circumferential directions.

The body 60 includes multiple (four in the present embodiment) screw bosses 69 located circumferentially at intervals about the insertion hole 63. Each screw boss 69 has a threaded hole. The lid 62 includes multiple (four in the present embodiment) screw bosses 70 located circumferentially at intervals at its peripheral edge. Each screw boss 70 has an opening. A screw 71 is fastened into, with its distal end, the threaded hole of the corresponding screw boss 69 with the middle portion of the screw 71 received in an opening of the screw boss 70. This structure fixes the body 60 and the lid 62.

As shown in FIG. 5, the internal space 59 has a circular space 59A and an extended space 59B. The stator core 30 is located in the circular space 59A. The connector 50 of the insulator 31 is located in the extended space 59B. The extended space 59B is defined above the circular space 59A. The extended space 59B extends upward from the circular space 59A.

The body 60 includes a cylindrical portion 60A, an extension 60B, and a wall 60C. The cylindrical portion 60A defines the circular space 59A. The extension 60B defines the extended space 59B. The wall 60C is connected to the left end of the cylindrical portion 60A. The extension 60B is located above the cylindrical portion 60A. The extension 60B protrudes upward from the cylindrical portion 60A.

The lid 62 includes a disk 62A and an extension 62B. The disk 62A is connected to the cylindrical portion 60A. The extension 62B is connected to the extension 60B. The extension 62B is located above the disk 62A. The extension 62B protrudes upward from the disk 62A.

The motor case 13 is formed from a metal. The motor case 13 has higher thermal conductivity than the stator core 30. The motor case 13 in the embodiment is formed from aluminum. The stator core 30 is formed from an iron-based steel. The thermal conductivity of the motor case 13 is about 236 W/(m·K). The stator core 30 has a thermal conductivity of about 84 W/(m·K).

The motor case 13 may be formed from an aluminum die-casting alloy (ADC12). Then, the thermal conductivity of the motor case 13 is about 96 W/(m·K).

In some embodiments, the motor case 13 may have a thermal conductivity of 100 W/(m·K) or more, and specifically 200 W/(m·K) or more. The motor case 13 with such high thermal conductivity is expected to provide high heat dissipation.

Bearing

The bearings 18 support the rotor shaft 29 in a rotatable manner. The bearings 18 are supported on the motor case 13.

The motor case 13 has shaft holes 72. The rotor shaft 29 is at least partially received in the shaft holes 72. The shaft holes 72 connect the internal space 59 and the external space of the motor case 13. The shaft holes 72 in the embodiment include a shaft hole 72L and a shaft hole 72R. The shaft hole 72L receives the left portion of the rotor shaft 29. The shaft hole 72R receives the right portion of the rotor shaft 29. The shaft hole 72L is formed in the wall 60C of the body 60. The shaft hole 72R is formed in the disk 62A of the lid 62.

The motor case 13 includes peripheral walls 101 defining the shaft holes 72. The peripheral walls 101 are substantially cylindrical. The peripheral walls 101 include a peripheral wall 101L and a peripheral wall 101R. The peripheral wall 101L defines the shaft hole 72L. The peripheral wall 101R defines the shaft hole 72R. The peripheral wall 101L is located on the wall 60C of the body 60. The peripheral wall 101L protrudes from the left surface of the wall 60C to the left. The peripheral wall 101R is located on the disk 62A of the lid 62. The peripheral wall 101R protrudes from the right surface of the disk 62A to the right.

The bearings 18 include a left bearing 18L and a right bearing 18R. The left bearing 18L supports the left portion of the rotor shaft 29. The right bearing 18R supports the right portion of the rotor shaft 29. The left bearing 18L is received in the shaft hole 72L. The right bearing 18R is received in the shaft hole 72R.

The right and left ends of the rotor shaft 29 are located outside the motor case 13. At least one of the right and left ends of the rotor shaft 29 is connected to the saw chain 10 through the power transmission assembly (not shown). The saw chain 10 is driven by the rotor shaft 29. The rotor shaft 29 rotates to drive the saw chain 10.

Heat Transfer Resin Portion

The heat transfer resin portion 19 is accommodated in the motor case 13. The heat transfer resin portion 19 is in contact with the coils 32 and the motor case 13. The heat transfer resin portion 19 covers the coils 32. The heat transfer resin portion 19 in the embodiment is in contact with the stator core 30 and the insulator 31.

The heat transfer resin portion 19 is formed from a synthetic resin. The heat transfer resin portion 19 is highly thermally conductive and insulating (electrically insulating). For example, when the insulator 31 is formed from a nylon resin with a thermal conductivity of 0.2 W/(m·K), the thermal conductivity of the synthetic resin used for the heat transfer resin portion 19 is higher than 0.2 W/(m·K).

An insulating synthetic resin with a thermal conductivity higher than 0.2 W/(m·K) is, for example, an unsaturated polyester resin. The heat transfer resin portion 19 may be formed from a nylon resin containing insulating, thermally conductive fillers.

After the stator 27 is placed inside the body 60 through the insertion hole 63, a heated and melted synthetic resin is fed inside the body 60 through the insertion hole 63. The synthetic resin fed inside the body 60 solidifies to form the heat transfer resin portion 19.

Cooling Fan

The cooling fan 20 is located outside the motor case 13. The cooling fan 20 faces at least a part of the outer surface of the motor case 13. The cooling fan 20 is fixed to the rotor shaft 29. The cooling fan 20 is rotated by the rotor shaft 29.

The cooling fan 20 in the embodiment is located rightward from the motor case 13. The cooling fan 20 is fixed to the right end of the rotor shaft 29 located outside the motor case 13. The cooling fan 20 faces at least a part of the lid 62.

The cooling fan 20 in the embodiment is a centrifugal fan. The cooling fan 20 includes a first plate 20B, a second plate 20D, and multiple blades 20E. The first plate 20B has an inlet 20A. The second plate 20D has an opening 20C. The multiple blades 20E are located between the first plate 20B and the second plate 20D. The peripheral edges of the first plate 20B and the second plate 20D define an outlet 20F between them.

The cooling fan 20 generates an airflow to cool the motor case 13. As the rotor shaft 29 rotates, the cooling fan 20 rotates together with the rotor shaft 29. Air around the cooling fan 20 is then drawn through the inlet 20A. The air drawn through the inlet 20A is blown out through the outlet 20F. At least a portion of the air blown out through the outlet 20F hits the outer surface of the motor case 13. The motor case 13 is thus cooled.

The cooling fan 20 in the embodiment is fixed to the rotor shaft 29 with a fan bush 73. The fan bush 73 is an intermediate member connecting the rotor shaft 29 and the cooling fan 20. The fan bush 73 is located outside the motor case 13 to connect the right end of rotor shaft 29 and the cooling fan 20. As the cooling fan 20 rotates, the fan bush 73 rotates together with the cooling fan 20.

The fan bush 73 includes a disk 73A and a cylindrical portion 73B. The disk 73A is located leftward from the cooling fan 20. The cylindrical portion 73B is received in the opening 20C of the cooling fan 20. The cylindrical portion 73B has a support hole 73C. The right end of the rotor shaft 29 is placed in the support hole 73C.

The cooling fan 20 is formed from a synthetic resin. The synthetic resin for the cooling fan 20 is, for example, a nylon resin. The fan bush 73 is formed from a metal. The metal for the fan bush 73 is, for example, iron.

Sensor Magnet

The sensor magnets 21 are located outside the motor case 13. The sensor magnets 21 are permanent magnets. The sensor magnets 21 are rotated by the rotor shaft 29.

The sensor magnets 21 are fixed to a rotary member located outside the motor case 13 and fixed to the end of the rotor shaft 29. The rotary member is, for example, the cooling fan 20 or the fan bush 73. The sensor magnets 21 in the embodiment are fixed to the fan bush 73. The sensor magnets 21 are fixed to the cooling fan 20 with the fan bush 73.

Multiple sensor magnets 21 are located circumferentially at intervals. The sensor magnets 21 in the embodiment are fixed to the disk 73A of the fan bush 73. The sensor magnets 21 are located inside the disk 73A. The sensor magnets 21 are arranged about the rotation axis AX.

The disk 73A has multiple (eight in the present embodiment) magnet slots 73D located circumferentially at intervals. The magnet slots 73D extend through the right and left end faces of the disk 73A. The sensor magnets 21 are received in the magnet slots 73D. The multiple (eight in the present embodiment) sensor magnets 21 are located circumferentially at intervals.

Sensor Board

Figure 11:
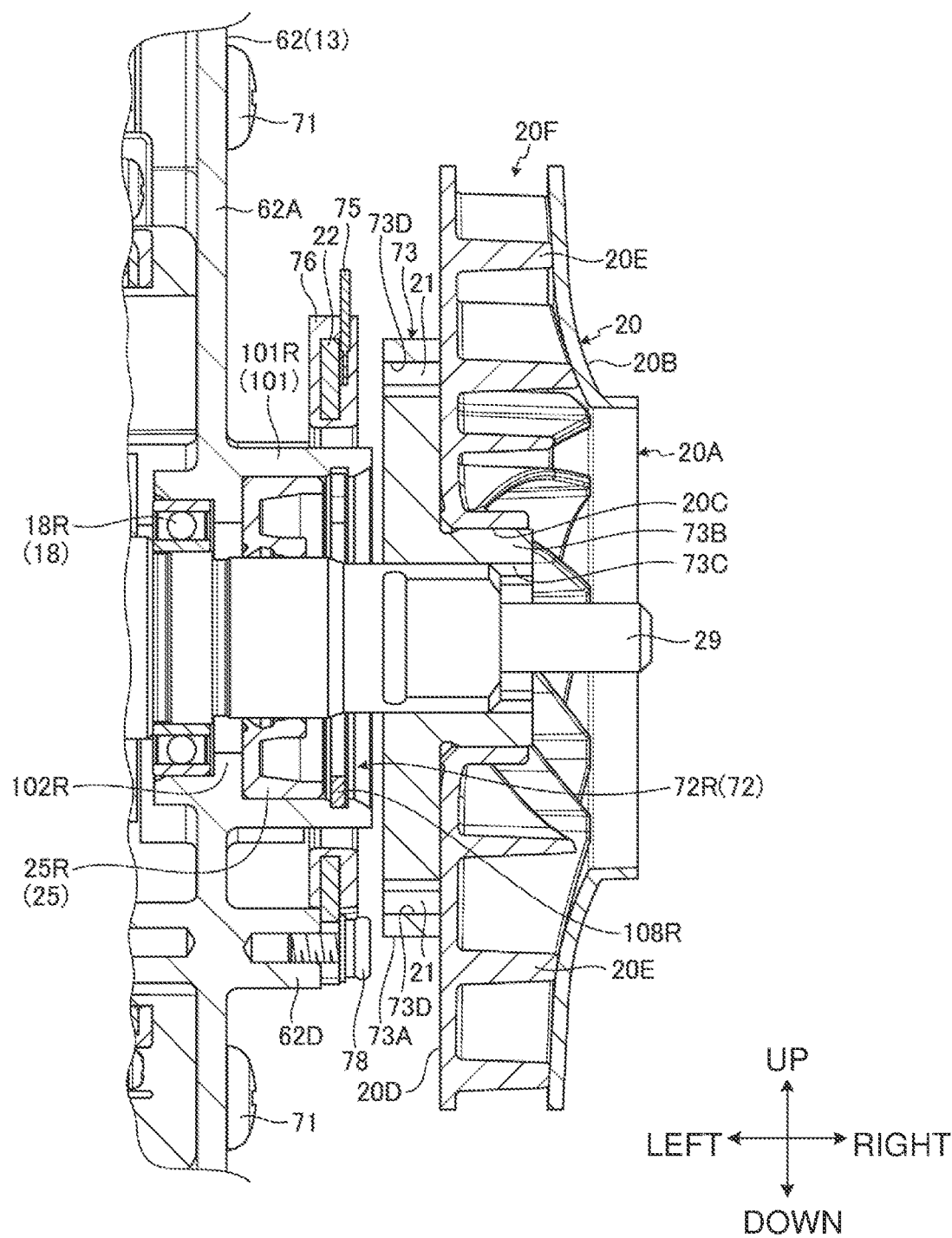
FIG. 11 is a longitudinal sectional view of a portion near a sensor board in the first embodiment.
Figure 12:
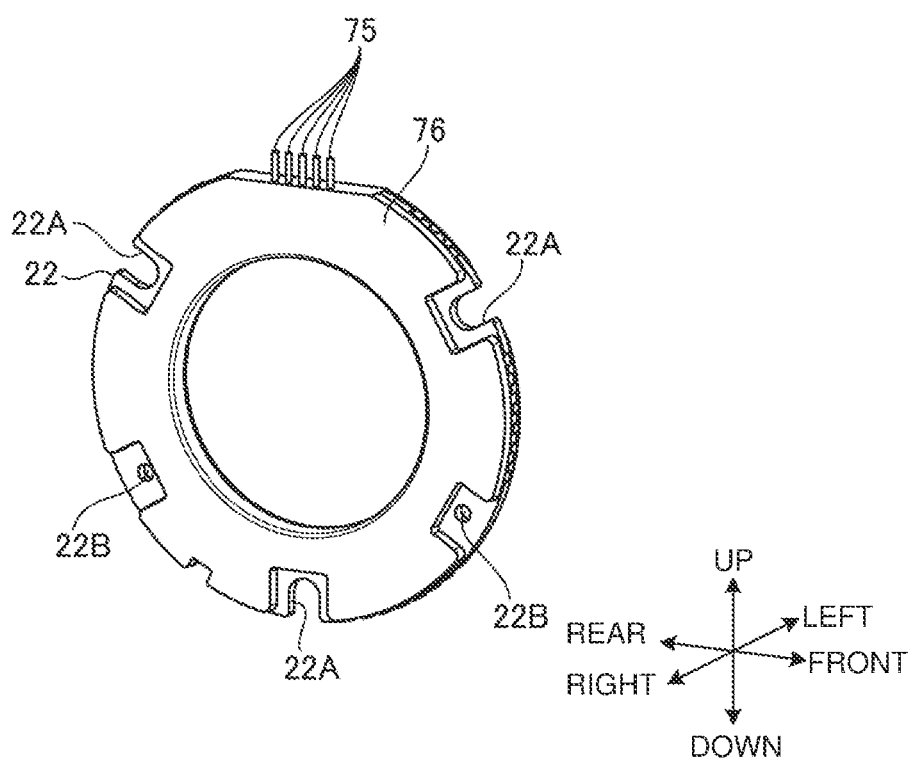
FIG. 12 is a perspective view of the sensor board in the first embodiment.
Figure 13:
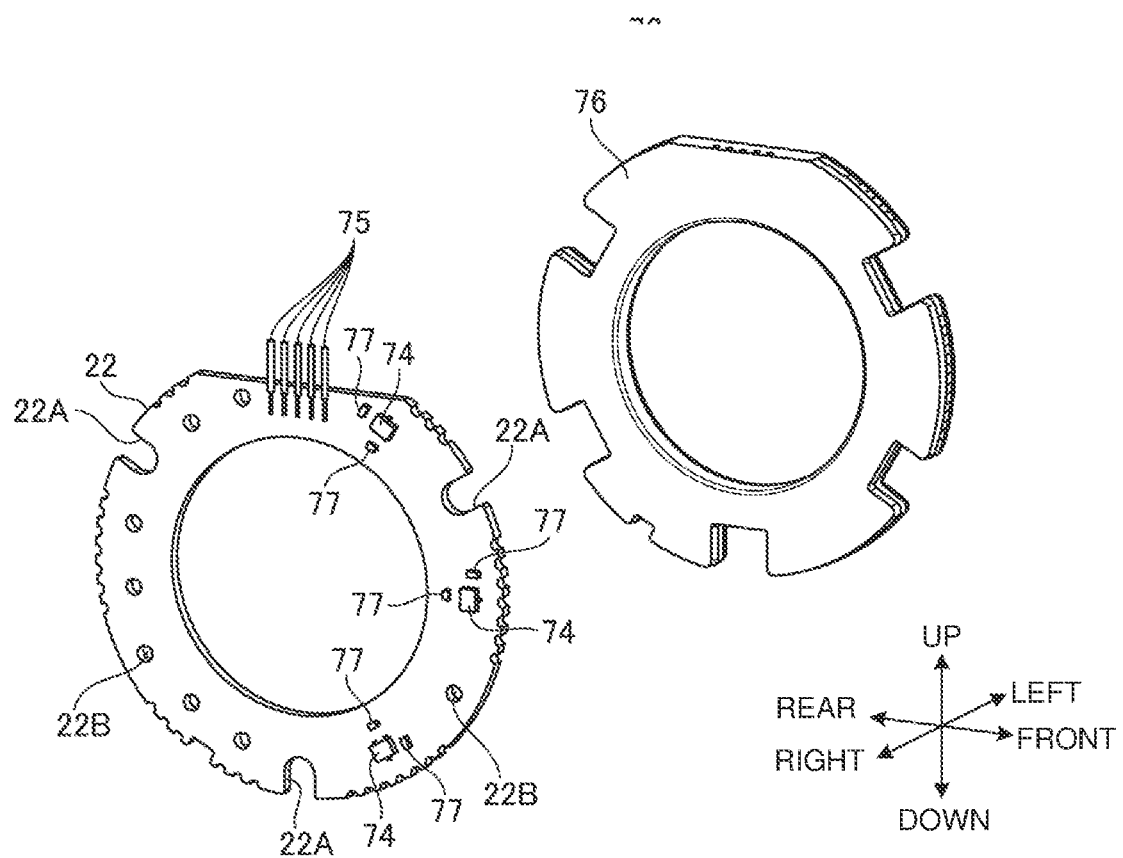
FIG. 13 is an exploded perspective view of the sensor board in the first embodiment.

FIG. 11 is a longitudinal sectional view of a portion near the sensor board 22 in the embodiment. FIG. 12 is a perspective view of the sensor board 22 in the embodiment. FIG. 13 is an exploded perspective view of the sensor board 22 in the embodiment.

As shown in FIGS. 4, 7, and 11 to 13, the sensor board 22 is located outside the motor case 13. The sensor board 22 supports magnetic sensors 74. The magnetic sensors 74 are located outside the motor case 13. The magnetic sensors 74 detect the sensor magnets 21. The magnetic sensors 74 are, for example, Hall devices. The magnetic sensors 74 detect the sensor magnets 21 to detect rotation of the rotor 28. Five signal lines 75 are connected to the sensor board 22. Signals detected by the magnetic sensors 74 are transmitted to the controller 6 through the signal lines 75.

In the axial direction, the sensor board 22 is located between at least a part of the motor case 13 and the cooling fan 20. In the axial direction, the sensor board 22 is located between at least apart of the motor case 13 and the sensor magnets 21. The sensor board 22 in the embodiment is located between the disk 62A of the lid 62 and the fan bush 73. The magnetic sensors 74 supported on the sensor board 22 are located between the motor case 13 and the cooling fan 20. The magnetic sensors 74 are located on the right surface of the sensor board 22. The magnetic sensors 74 face the sensor magnets 21.

The sensor board 22 is annular. The sensor board 22 in the embodiment has, at its peripheral edge, three notches 22A located circumferentially at intervals. The sensor board 22 has multiple holes 22B each extending through the right and left surfaces of the sensor board 22.

The magnetic sensors 74 and at least a part of the surface of the sensor board 22 are covered with a resin film 76. The resin film 76 covers the right and left surfaces of the sensor board 22. The sensor board 22 includes, in addition to the magnetic sensors 74, multiple electronic components 77 mounted on its surface. The electronic components 77 mounted on the surface of the sensor board 22 are, for example, a capacitor, a resistor, and a thermistor. The resin film 76 also covers the electronic components 77.

The three notches 22A are not covered with the resin film 76. The two holes 22B are not covered with the resin film 76. The surface of the sensor board 22 is exposed around the notches 22A. The surface of the sensor board 22 is exposed around the holes 22B.

The resin film 76 insulates electricity and transmits a magnetic field. The resin film 76 protects the sensor board 22, the magnetic sensors 74, and the electronic components 77. The resin film 76 is formed by low-temperature, low-pressure injection molding. The sensor board 22 is placed in a mold, into which a heated and melted synthetic resin is extruded at a low pressure of 0.1 to 10 MPa to be integrally molded into the sensor board 22. In one or more embodiments, a synthetic resin forming the resin film 76 may be a thermoplastic resin with a softening point of less than 200° C. and may be a thermoplastic resin with a melting point of less than 200° C. The synthetic resin forming the resin film 76 is, for example, a synthetic resin containing, as a main component (at a percentage by weight of 50% or more), polyamide (nylon) containing an aliphatic skeleton.

The sensor board 22 in the embodiment surrounds the peripheral wall 101R.

The sensor board 22 is fixed to the motor case 13. The disk 62A of the lid 62 includes three screw bosses 62D. Each screw boss 62D has a threaded hole. The disk 62A of the lid 62 includes two positioning pins 62E. The positioning pins 62E protrude from the right surface of the disk 62A to the right. The positioning pins 62E in the embodiment are received in the openings in the disk 62A.

The sensor board 22 is fastened to the lid 62 with screws 78. Each of the two holes 22B in the sensor board 22 receives the corresponding positioning pin 62E. Each of the three notches 22A in the sensor board 22 receives the corresponding screw boss 62D. The sensor board 22 is thus connected to the lid 62. The distal end of each screw 78 is then fastened into the threaded hole in the corresponding screw boss 62D. The sensor board 22 is held between the heads of the screws 78 and the right end faces of the screw bosses 62D. The sensor board 22 is thus fastened to the lid 62 with the screws 78.

First Seal and Press Assembly

Figure 14:
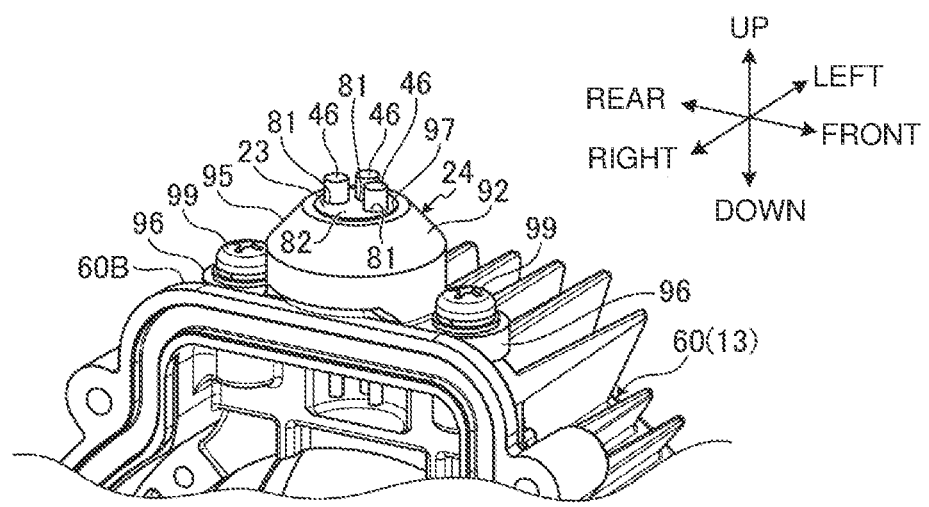
FIG. 14 is a perspective view of a first seal and a press assembly in the first embodiment.
Figure 15:
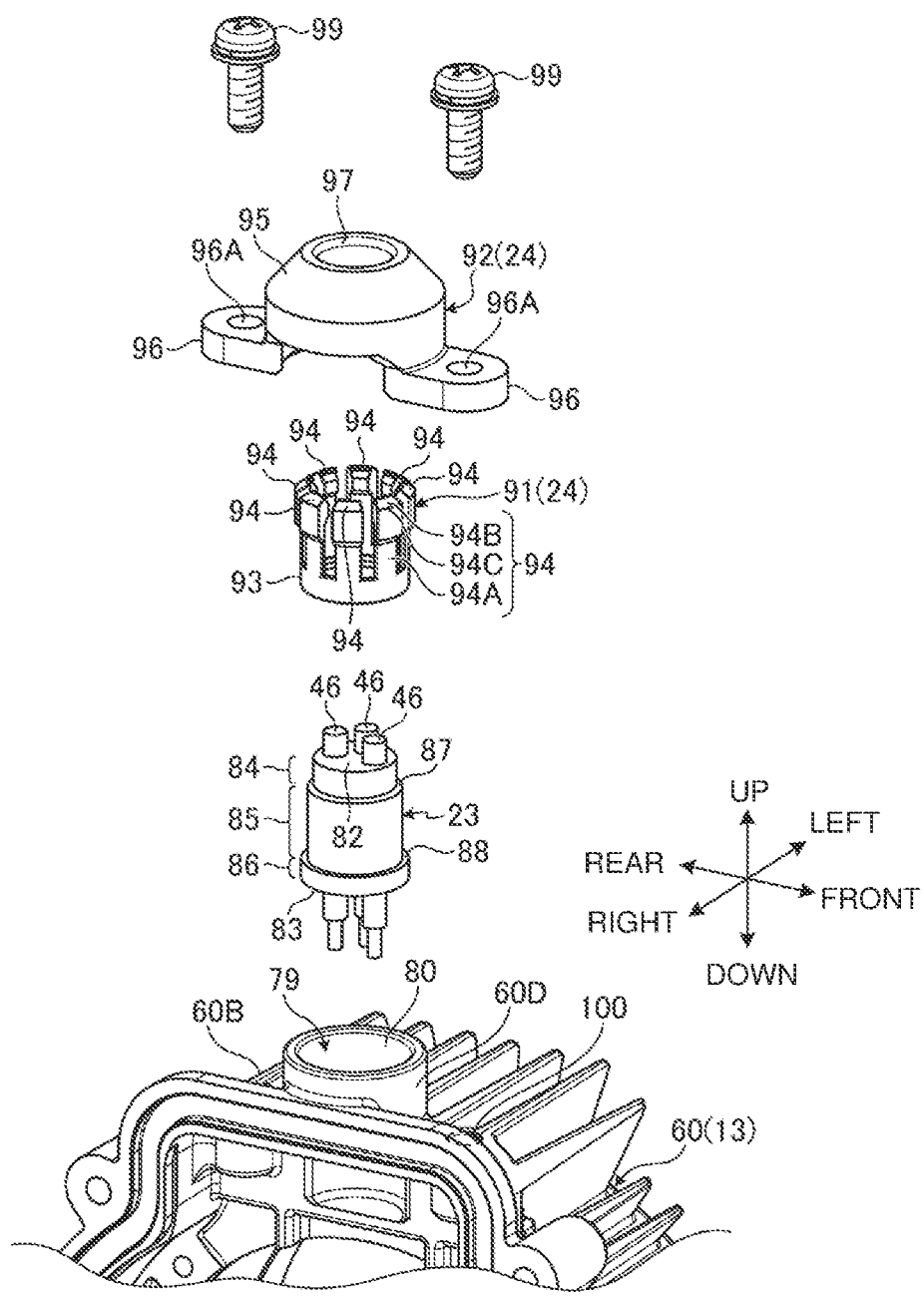
FIG. 15 is an exploded perspective view of the first seal and the press assembly in the first embodiment.
Figure 16:
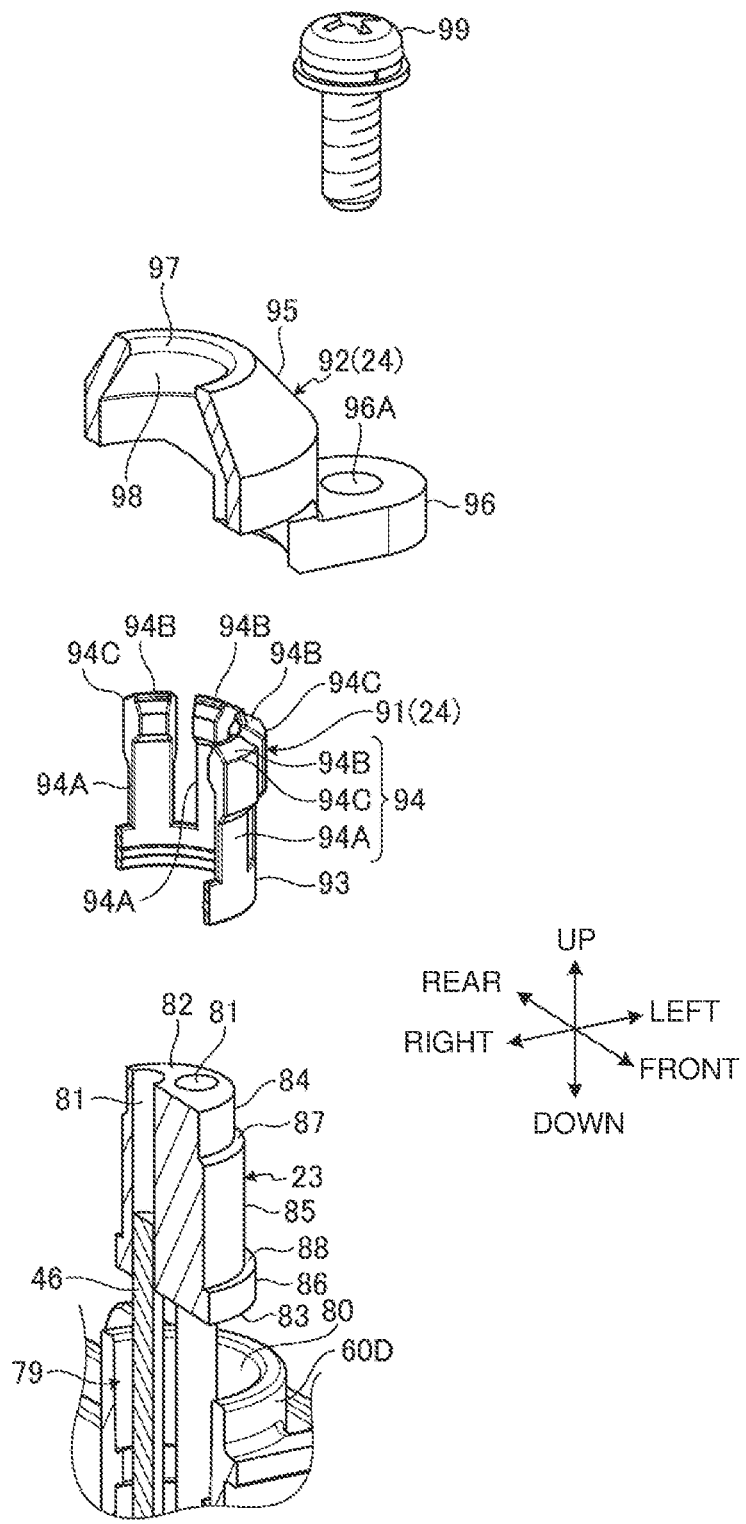
FIG. 16 is an exploded perspective longitudinal sectional view of the first seal and the press assembly in the first embodiment.
Figure 17:
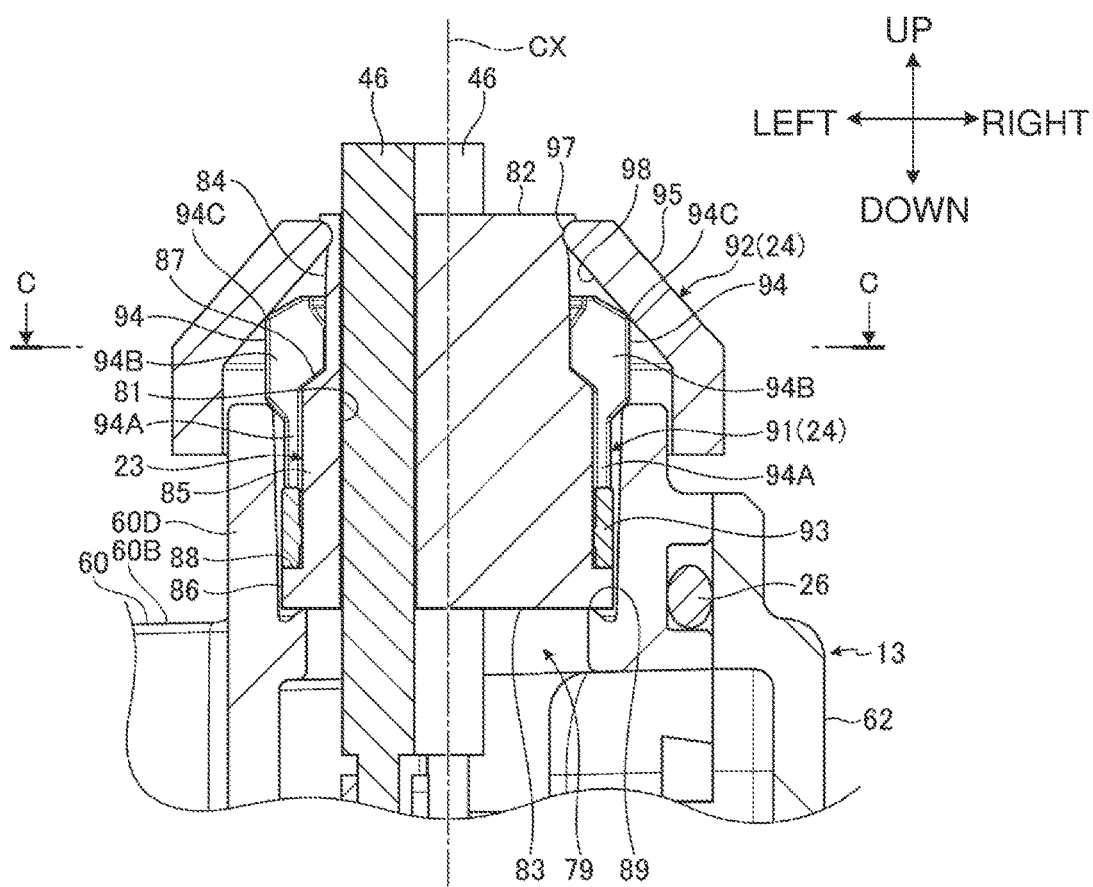
FIG. 17 is a longitudinal sectional view of the first seal and the press assembly in the first embodiment.
Figure 18:
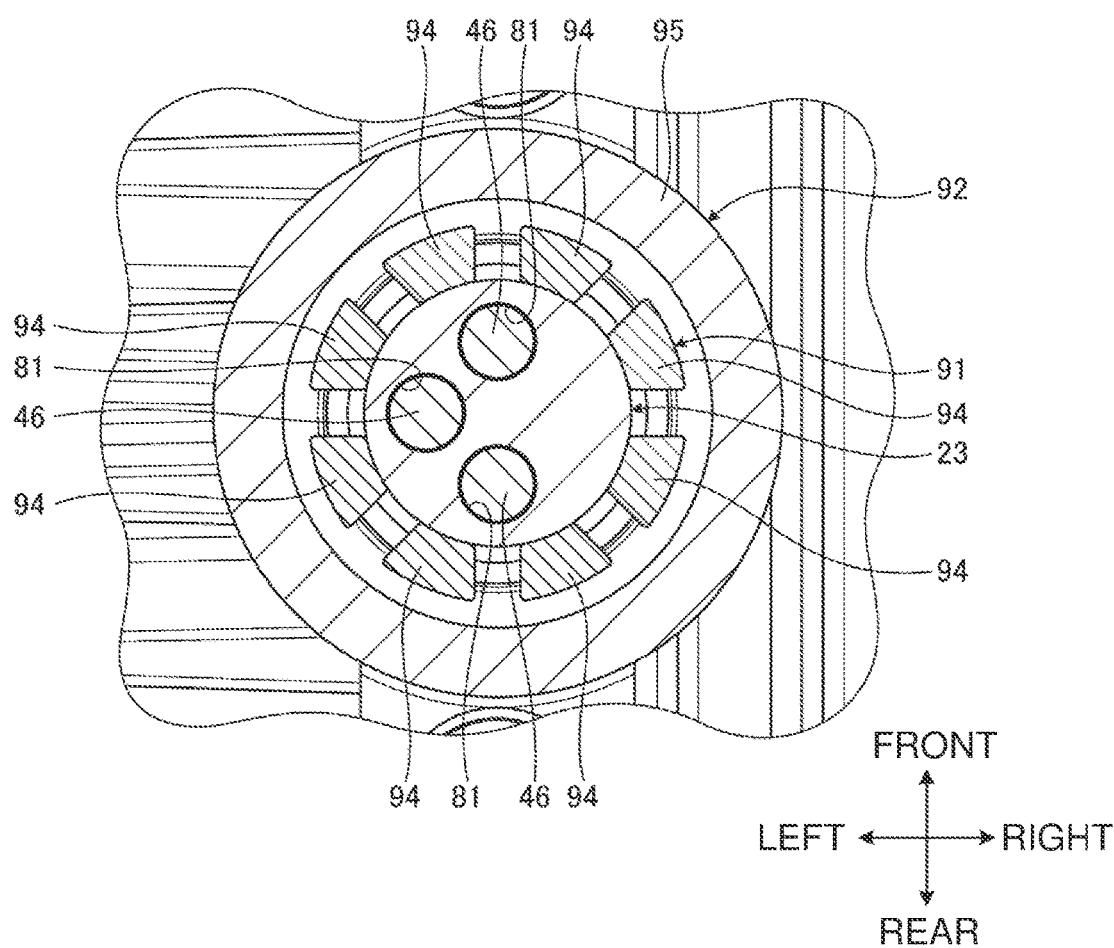
FIG. 18 is a cross-sectional view of the first seal and the press assembly in the first embodiment.

FIG. 14 is a perspective view of the first seal 23 and the press assembly 24 in the embodiment. FIG. 15 is an exploded perspective view of the first seal 23 and the press assembly 24 in the embodiment. FIG. 16 is an exploded perspective longitudinal sectional view of the first seal 23 and the press assembly 24 in the embodiment. FIG. 17 is a longitudinal sectional view of the first seal 23 and the press assembly 24 in the embodiment. FIG. 18 is a cross-sectional view of the first seal 23 and the press assembly 24 in the embodiment, taken along line C-C in FIG. 17 as viewed in the direction indicated by arrows.

The motor case 13 has a wiring passage 79 connecting the internal space 59 and the external space of the motor case 13. The wiring passage 79 is defined in the extension 60B of the body 60. In the embodiment, the extension 60B includes a cylindrical portion 60D. The cylindrical portion 60D protrudes upward from the extension 60B. The cylindrical portion 60D defines at least a part of the wiring passage 79.

The three power lines 46 are located in the wiring passage 79. The power lines 46 are lead wires. The power lines 46 are connected to the coils 32 through the connector terminals 47 and the busbar unit 33.

The first seal 23 seals between each power line 46 and the motor case 13. The first seal 23 is substantially cylindrical. The first seal 23 has a central axis CX extending vertically. The first seal 23 is formed from rubber. The first seal 23 is located in the wiring passage 79. The wiring passage 79 has an insertion end opening 80 facing the outer space of the motor case 13. The insertion end opening 80 in the embodiment is open at the upper end of the cylindrical portion 60D. The first seal 23 is placed into the wiring passage 79 through the insertion end opening 80. In other words, the first seal 23 is placed inside the cylindrical portion 60D from above the cylindrical portion 60D.

The first seal 23 has three holes 81 receiving the power lines 46. The holes 81 extend through an upper surface 82 and a lower surface 83 of the first seal 23. The three holes 81 are parallel to one another. Each hole 81 receives the corresponding power line 46. The outer surface of each power line 46 and the inner surface of the corresponding hole 81 are in close contact with each other.

The first seal 23 includes a first portion 84, a second portion 85, and a third portion 86. The second portion 85 is located below the first portion 84. The third portion 86 is located below the second portion 85. The second portion 85 has a greater diameter than the first portion 84. The third portion 86 has a greater diameter than the second portion 85.

The first portion 84 and the second portion 85 have a step between them. The first portion 84 and the second portion 85 have a tapered surface 87 between them. The tapered surface 87 slopes downward and outward in the radial direction with respect to the central axis CX of the first seal 23.

The second portion 85 and the third portion 86 have a step between them. The second portion 85 and the third portion 86 have a support surface 88 between them. The support surface 88 faces upward. The support surface 88 is annular in a plane orthogonal to the central axis CX.

As shown in FIG. 17, the motor case 13 includes a protrusion 89 facing the wiring passage 79. The protrusion 89 is located on the inner surface of the wiring passage 79. The protrusion 89 protrudes toward the center of the wiring passage 79 (central axis CX) and upward. The protrusion 89 is annular in a plane orthogonal to the central axis CX. The lower surface 83 of the first seal 23 can come in contact with the protrusion 89. The lower surface 83 includes a contact portion that can come in contact with the protrusion 89 of the motor case 13. As described above, the protrusion 89 is annular. The annular area of the lower surface 83 comes into contact with the protrusion 89. When the first seal 23 is placed in the wiring passage 79 through the insertion end opening 80, at least a part of the lower surface 83 of the first seal 23 and the protrusion 89 come into contact with each other.

The press assembly 24 applies pressure to the first seal 23 in the wiring passage 79. The press assembly 24 compresses the first seal 23 to have the inner surface of each hole 81 in the first seal 23 in close contact with the outer surface of the corresponding power line 46. The press assembly 24 presses the first seal 23 against the protrusion 89 on the motor case 13 to have the lower surface 83 of the first seal 23 in close contact with the protrusion 89 on the motor case 13.

The inner surface of each hole 81 in the first seal 23 and the outer surface of the corresponding power line 46 being in close contact with each other seal between each power line 46 and the first seal 23. The lower surface 83 of the first seal 23 and the protrusion 89 on the motor case 13 being in close contact with each other seal between the first seal 23 and the motor case 13. This structure seals between each power line 46 and the motor case 13.

The press assembly 24 includes a press member 91 and a cover 92.

The press member 91 includes a ring 93 and multiple tabs 94. The ring 93 surrounds the first seal 23. The tabs 94 are connected to the ring 93.

The ring 93 surrounds the second portion 85 of the first seal 23. The lower end of the ring 93 is in contact with the support surface 88 of the first seal 23. The central axis of the ring 93 aligns with the central axis CX of the first seal 23.

The tabs 94 are connected to an upper portion of the ring 93. The multiple tabs 94 surround the central axis CX. Each tab 94 includes an elastic deformable portion 94A and a head 94B. The elastic deformable portion 94A is connected to the ring 93. The head 94B is connected to an upper portion of the elastic deformable portion 94A. The elastic deformable portion 94A elastically deforms to move the head 94B radially.

With the cover 92 in contact with the press member 91, the cover 92 is fixed to the motor case 13. The cover 92 includes a peripheral wall 95 and fastening portions 96. The peripheral wall 95 surrounds the tabs 94. The fastening portions 96 are fixed to the motor case 13.

The peripheral wall 95 has an opening 97 to receive the upper end of the first portion 84. The peripheral wall 95 includes an inner surface 98 that slopes downward and outward from the opening 97 in the radial direction with respect to the central axis CX. The inner surface 98 surrounds the central axis CX. The inner surface 98 is in contact with at least parts of the tabs 94. The inner surface 98 is in contact with the multiple tabs 94 at a time. The inner surface 98 in the embodiment is in contact with the heads 94B of the tabs 94. Each head 94B includes a corner 94C protruding outward in the radial direction with respect to the central axis CX. The inner surface 98 is in contact with the corners 94C.

The fastening portions 96 are connected to the lower portion of the peripheral wall 95. The fastening portions 96 are located in the front portion and the rear portion of the peripheral wall 95. Each fastening portion 96 is a plate. The fastening portion 96 has an opening 96A receiving a screw 99. The fastening portions 96 are fastened to the motor case 13 with the screws 99.

As shown in FIGS. 5, 6, and 15, the motor case 13 has threaded holes 100 in at least a part of its outer surface. The threaded holes 100 in the embodiment are located in the extension 60B of the body 60. With the middle portion of each screw 99 received in the opening 96A in the corresponding fastening portion 96, each screw 99 has its distal end fastened into the corresponding threaded hole 100. The cover 92 is thus fastened to the motor case 13. The fastening portions 96 are in contact with the outer surface of the motor case 13.

The heads 94B of the tabs 94 are movable in the radial direction with respect to the central axis CX through elastic deformation of the elastic deformable portions 94A. With the inner surface 98 of the peripheral wall 95 and the corners 94C of the heads 94B in contact with each other, the cover 92 is fastened to the motor case 13 with the screws 99. The cover 92 then moves downward. In other words, when the screws 99 are rotated, the cover 92 moves downward toward the motor case 13.

When the cover 92 moves downward, the heads 94B are pushed inward in the radial direction with respect to the central axis CX by the peripheral wall 95. As the heads 94B move radially inward, the multiple tabs 94 compress the first seal 23. With the tabs 94 on the press member 91 and the cover 92 in contact with each other, the cover 92 moves downward. The tabs 94 in contact with the cover 92 elastically deform radially inward from the ring 93 and compress the first seal 23. This causes the outer surface of each power line 46 and the inner surface of the corresponding hole 81 to come into close contact with each other.

When the cover 92 moves downward, the heads 94B are moved by the peripheral wall 95 in the axial direction parallel to the central axis CX. In other words, when the cover 92 moves downward, the press member 91 moves downward. The ring 93 in the press member 91 comes in contact with the support surface 88 of the first seal 23. When the press member 91 including the ring 93 moves downward, the first seal 23 also moves downward and is pressed against the protrusion 89. With the tabs 94 on the press member 91 and the cover 92 in contact with each other, the cover 92 moves downward. The contact between the tabs 94 and the cover 92 then causes the ring 93 to move in the axial direction (downward) of the ring 93 to press the lower surface 83 of the first seal 23 against the protrusion 89. This causes the lower surface 83 and the protrusion 89 to come into close contact with each other.

Second Seal

The second seals 25 seal between the rotor shaft 29 and the motor case 13. The second seals 25 are received in the shaft holes 72. As shown in FIG. 7, the second seals 25 include a second seal 25L and a second seal 25R. The second seal 25L seals between the left portion of the rotor shaft 29 and the motor case 13. The second seal 25R seals between the right portion of the rotor shaft 29 and the motor case 13. The second seal 25L is received in the shaft hole 72L. The second seal 25R is received in the shaft hole 72R.

The peripheral walls 101 surround the second seals 25. The peripheral walls 101 support the second seals 25. The second seals 25 are press-fitted between the rotor shaft 29 and the peripheral walls 101.

Figure 19:
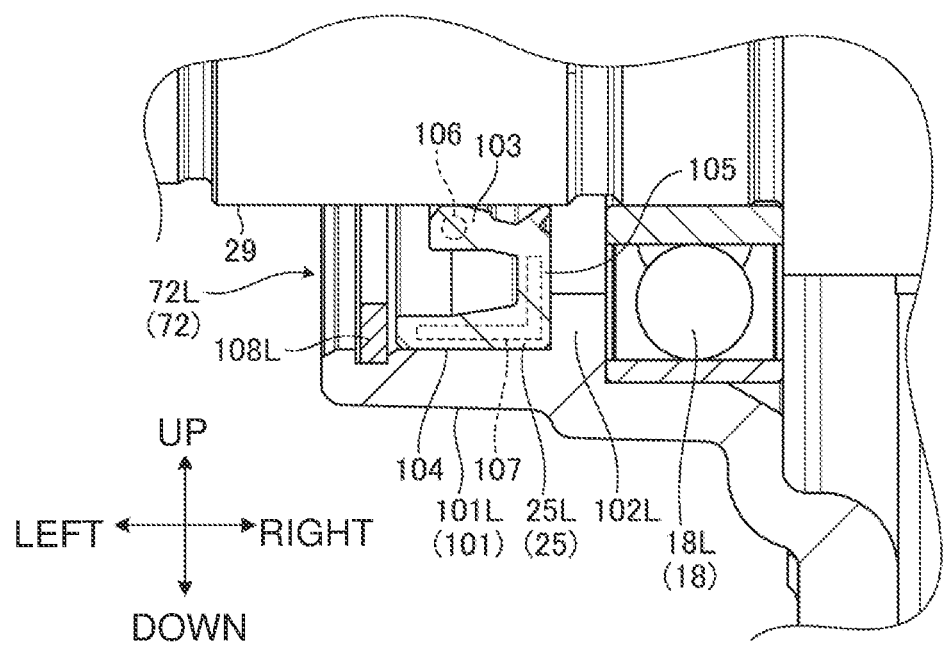
FIG. 19 is a longitudinal sectional view of a portion near a second seal in the first embodiment.

FIG. 19 is a longitudinal sectional view of a portion near the second seal 25L in the embodiment. As shown in FIGS. 3, 7, and 19, the peripheral wall 101L surrounds the second seal 25L. The second seal 25L is located leftward from the left bearing 18L. The peripheral wall 101L includes a rib 102L on its inner surface. The rib 102L protrudes radially inward from the inner surface of the peripheral wall 101L. The rib 102L is annular in a plane orthogonal to the rotation axis AX. The rib 102L is located between the second seal 25L and the left bearing 18L. The left surface of the rib 102L supports the second seal 25L. The right surface of the rib 102L supports the left bearing 18L.

The second seal 25L is supported on the peripheral wall 101L and the rib 102L. The peripheral wall 101L surrounds the left portion of the rotor shaft 29. The second seal 25L is press-fitted between the left portion of the rotor shaft 29 and the peripheral wall 101L.

The second seal 25L includes an oil seal. The second seal 25L includes a lip 103, an outer circumferential portion 104, and a connector 105. The lip 103 is in contact with the rotor shaft 29. The outer circumferential portion 104 is in contact with the peripheral wall 101L. The connector 105 is in contact with the rib 102L. The connector 105 connects the lip 103 and the outer circumferential portion 104. The lip 103 includes a spring 106 inside. The spring 106 generates an elastic force fastening the rotor shaft 29. The outer circumferential portion 104 and the connector 105 include a metal ring 107 inside. The metal ring 107 functions as the framework of the second seal 25L.

A stopper 108L is located at the left of the second seal 25L. The stopper 108L prevents the second seal 25L from slipping out of the shaft hole 72L. The stopper 108L is, for example, a circlip.

As shown in FIG. 11, the second seal 25R is located rightward from the right bearing 18R. The peripheral wall 101R includes a rib 102R on its inner surface. The rib 102R is located between the second seal 25R and the right bearing 18R. The right surface of the rib 102R supports the second seal 25R. The left surface of the rib 102R supports the right bearing 18R.

The second seal 25R is supported on the peripheral wall 101R and the rib 102R. The peripheral wall 101R surrounds the right portion of the rotor shaft 29. The second seal 25R is press-fitted between the right portion of the rotor shaft 29 and the peripheral wall 101R.

The second seal 25R includes an oil seal, similarly to the second seal 25L.

As shown in FIGS. 4 and 11, a stopper 108R is located at the right of the second seal 25R. The stopper 108R prevents the second seal 25R from slipping out of the shaft hole 72R. The stopper 108R is, for example, a circlip.

Third Seal

The third seal 26 seals between the body 60 and the lid 62. The third seal 26 includes an O-ring. As shown in FIGS. 5 and 6, the third seal 26 includes an arc 26A and a rectangular portion 26B. The arc 26A is located between the cylindrical portion 60A of the body 60 and the disk 62A of the lid 62. The rectangular portion 26B is located between the extension 60B of the body 60 and the extension 62B of the lid 62. The rectangular portion 26B is connected to upper portions of the arc 26A. The arc 26A is in contact with the peripheral edges of the cylindrical portion 60A and the disk 62A. The rectangular portion 26B is in contact with the peripheral edges of the extension 60B and the extension 62B.

Figure 20:
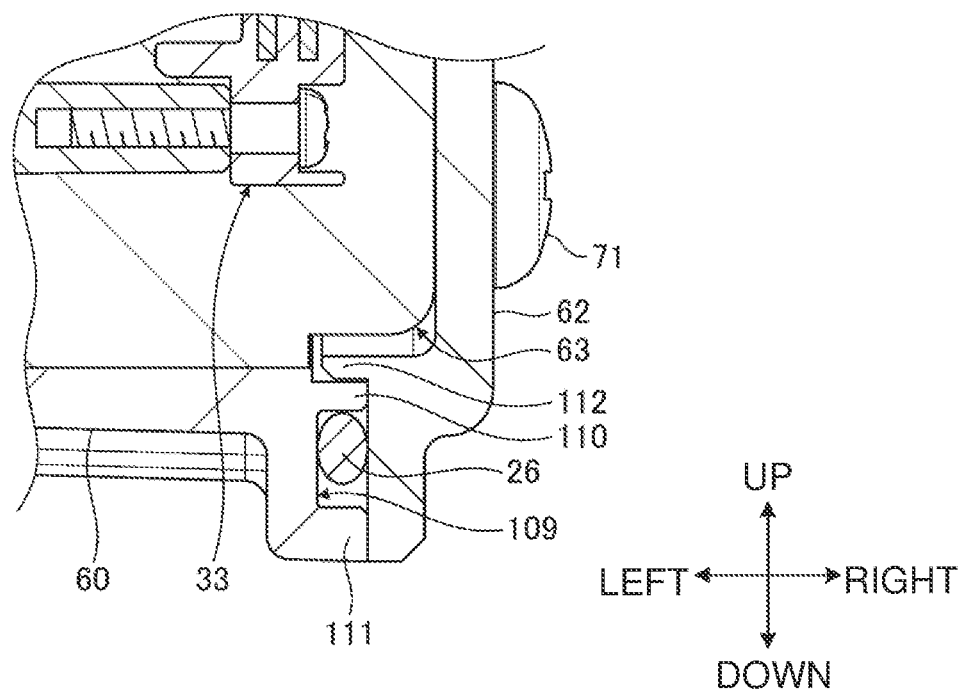
FIG. 20 is a longitudinal sectional view of a portion near a third seal in the first embodiment.

FIG. 20 is a longitudinal sectional view of a portion near the third seal 26 in the embodiment. As shown in FIGS. 7 and 20, the body 60 has a recess 109 surrounding the insertion hole 63. The body 60 includes an inner peripheral wall 110 and an outer peripheral wall 111 on its right end face. The inner peripheral wall 110 and the outer peripheral wall 111 protrude rightward from the right end face of the body 60. The outer peripheral wall 111 is located radially outward from the inner peripheral wall 110. The recess 109 is defined by the right end face of the body 60, the inner peripheral wall 110, and the outer peripheral wall 111. The third seal 26 is received in the recess 109. In the recess 109, the third seal 26 is in contact with the right end face of the body 60 and the left end face of the lid 62.

As shown in FIGS. 6 and 20, the lid 62 includes a rib 112 fitted inside the inner peripheral wall 110. The rib 112 protrudes leftward from the left surface of the lid 62. The rib 112 and the inner peripheral wall 110 are in contact with each other.

The electric work machine 1 according to the embodiment includes the motor 12 that is a brushless motor and the saw chain 10 that is an output unit. The motor 12 includes the stator 27, the rotor 28 rotatable with respect to the stator 27, and the rotor shaft 29 fixed to the rotor 28. The saw chain 10 is driven by the rotor shaft 29. The electric work machine 1 includes the motor case 13 having the internal space 59 accommodating the stator 27 and the rotor 28. The motor case 13 has the wiring passage 79. The electric work machine 1 includes the lead wires located in the wiring passage 79, which connects the internal space 59 and the external space of the motor case 13. The electric work machine 1 includes the first seal 23 that seals between the lead wires and the motor case 13.

In the above structure, the first seal 23 seals between the lead wires located in the wiring passage 79 in the motor case 13 and the motor case 13. This structure allows the internal space 59 of the motor case 13 to be sealed hermetically. At least the stator 27 and the rotor 28 in the motor 12 are located in the hermetically sealed space. For example, the electric work machine 1 designed for use outdoors may be wet in the rain. The stator 27 and the rotor 28 are located in the hermetically sealed space in the motor case 13 to reduce the likelihood that the stator 27 and the rotor 28 are wet in the rain. The electric work machine 1 used outdoors may have foreign objects around. The stator 27 and the rotor 28 are located in the hermetically sealed space of the motor case 13 to reduce the likelihood that foreign objects are on the stator 27 and the rotor 28.

The stator 27 in the embodiment includes the stator core 30, the insulator 31 covering at least a part of the surface of the stator core 30, and the coils 32 attached to the insulator 31. The lead wires are connected to the coils 32.

For the lead wires being the power lines 46 connected to the coils 32, the first seal 23 seals between each power line 46 and the motor case 13.

The first seal 23 in the embodiment is received in the wiring passage 79.

This structure securely seals between each power line 46 and the motor case 13.

The motor case 13 in the embodiment includes the protrusion 89. The first seal 23 has the holes 81 receiving the power lines 46 and the lower surface 83 including the contact portion in contact with the protrusion 89 located in the wiring passage 79.

In the above structure, the outer surface of each power line 46 and the inner surface of the corresponding hole 81 being in contact with each other seal between each power line 46 and the first seal 23. The lower surface 83 of the first seal 23 being in contact with the protrusion 89 on the motor case 13 seals between the motor case 13 and the first seal 23. Thus, the first seal 23 seals between each power line 46 and the motor case 13.

The wiring passage 79 in the embodiment has the insertion end opening 80 facing the external space. The first seal 23 is placed in the wiring passage 79 through the insertion end opening 80 and causes the lower surface 83 of the first seal 23 to be in contact with the protrusion 89.

This seals between the motor case 13 and the first seal 23.

The electric work machine 1 according to the embodiment includes the press assembly 24 that compresses the first seal 23 to cause the outer surface of each power line 46 and the inner surface of the corresponding hole 81 to be in close contact with each other and presses the first seal 23 against the protrusion 89 to cause the lower surface 83 including the contact portion and the protrusion 89 to be in close contact with each other.

In the above structure, the press assembly 24 causes the outer surface of each power line 46 and the inner surface of the corresponding hole 81 to be in close contact with each other to seal between each power line 46 and the first seal 23. The press assembly 24 causes the lower surface 83 of the first seal 23 and the protrusion 89 on the motor case 13 to be in close contact with each other to seal between the motor case 13 and the first seal 23. Thus, the first seal 23 seals between each power line 46 and the motor case 13.

The press assembly 24 in the embodiment includes the press member 91 including the ring 93 surrounding the first seal 23 and the multiple tabs 94 connected to the ring 93, and the cover 92 fixed to the motor case 13 and in contact with the press member 91.

In the above structure, when the cover 92 is fixed to the motor case 13, the cover 92 applies pressure to the first seal 23 through the press member 91. The first seal 23 thus seals between each power line 46 and the motor case 13.

The tabs 94 in the embodiment in contact with the cover 92 elastically deform inward in the radial direction of the ring 93 and compress the first seal 23.

The outer surface of each power line 46 and the inner surface of the corresponding hole 81 are thus in close contact with each other.

The first seal 23 in the embodiment includes the support surface 88 in contact with the ring 93. Each tab 94 and the cover 92 in contact with each other cause the ring 93 to move in the axial direction of the ring 93 and press the first seal 23 against the protrusion 89.

Thus, the lower surface 83 including the contact portion of the first seal 23 and the protrusion 89 on the motor case 13 are in close contact with each other.

The cover 92 in the embodiment includes the peripheral wall 95 surrounding the tabs 94 and the fastening portions 96 fixed to the motor case 13.

This structure compresses the first seal 23 radially inward and presses the first seal 23 against the protrusion 89 on the motor case 13.

The rotor shaft 29 in the embodiment is at least partially received in the shaft holes 72 that connect the internal space 59 and the external space. The electric work machine 1 includes the second seals 25 that seal between the rotor shaft 29 and the motor case 13.

This structure allows the internal space 59 of the motor case 13 to be sealed hermetically.

The motor case 13 in the embodiment includes the peripheral walls 101 surrounding the second seals 25 and supporting the second seals 25.

This structure securely seals between the rotor shaft 29 and the motor case 13.

The second seals 25 in the embodiment are press-fitted between the rotor shaft 29 and the peripheral walls 101.

This structure securely seals between the rotor shaft 29 and the motor case 13.

Each second seal 25 in the embodiment includes an oil seal.

The oil seal thus seals between the rotor shaft 29 that rotates and the motor case 13.

The motor case 13 in the embodiment includes the body 60 having the insertion hole 63 receiving the stator 27, and the lid 62 covering the insertion hole 63 defining the internal space 59 with the body 60. The electric work machine 1 includes the third seal 26 that seals between the body 60 and the lid 62.

This structure allows the internal space 59 of the motor case 13 to be sealed hermetically.

The body 60 in the embodiment has the recess 109 surrounding the insertion hole 63. The third seal 26 is received in the recess 109.

The recess 109 positions the third seal 26.

The third seal 26 in the embodiment includes an O-ring.

The simple structure thus seals between the body 60 and the lid 62.

The electric work machine 1 according to the embodiment includes the bearings 18 supporting the rotor shaft 29. The bearings 18 are supported on the motor case 13.

The above structure reduces the likelihood that the relative positions between the bearings 18 and the motor case 13 change.

In the embodiment, the stator 27 surrounds at least a part of the rotor 28 in the internal space 59 of the motor case 13.

In the above structure, the motor 12 that is an inner-rotor brushless motor is accommodated in the motor case 13.

Second Embodiment

A second embodiment will now be described. The same or corresponding components as those in the above embodiment are given the same reference numerals herein and will be described briefly or will not be described.

Figure 21:
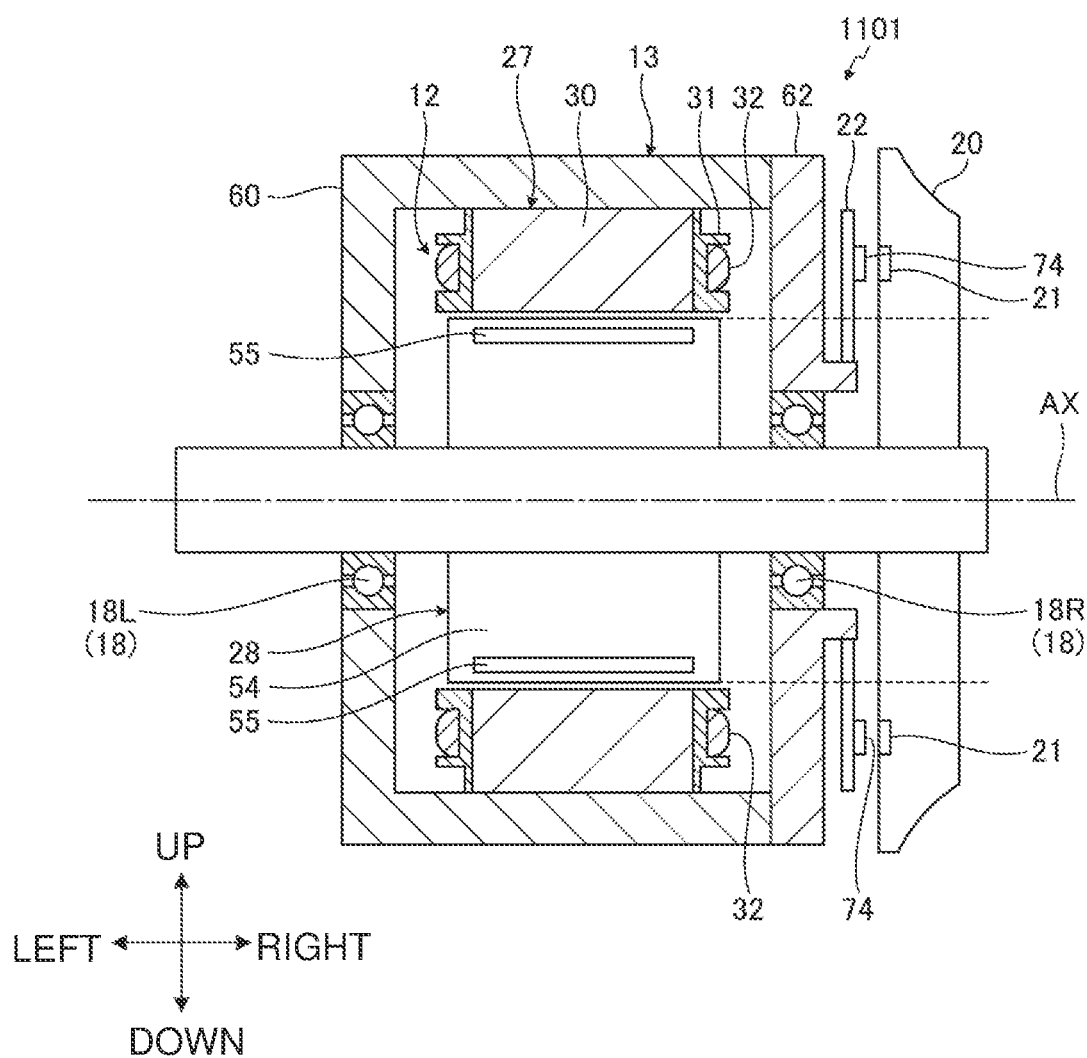
FIG. 21 is a schematic longitudinal sectional view of a motor assembly in a second embodiment.

FIG. 21 is a schematic longitudinal sectional view of a motor assembly 1101 in the embodiment. The magnetic sensors 74 are supported on the sensor board 22. As shown in FIG. 21, the magnetic sensors 74 are located radially outward from the rotor 28. More specifically, the magnetic sensors 74 are located radially outward from the outer surface of the rotor core 54.

The sensor magnets 21 are located radially outward from the rotor 28. More specifically, the sensor magnets 21 are located radially outward from the outer surface of the rotor core 54. The magnetic sensors 74 face the sensor magnets 21.

In the example shown in FIG. 21, the sensor magnets 21 are fixed directly to the cooling fan 20. The sensor magnets 21 may be fixed to a rotary member different from the cooling fan 20 and the fan bush 73.

In the above embodiment, as described above, the magnetic sensors 74 are located outside the rotor 28 in the radial direction with respect to the rotation axis AX of the rotor 28.

In the above structure, the magnetic sensors 74 are located away from the rotation axis AX. This structure improves the accuracy of detecting rotation of the rotor 28 with the magnetic sensors 74.

Third Embodiment

A third embodiment will now be described. The same or corresponding components as those in the above embodiments are given the same reference numerals herein and will be described briefly or will not be described.

Figure 22:
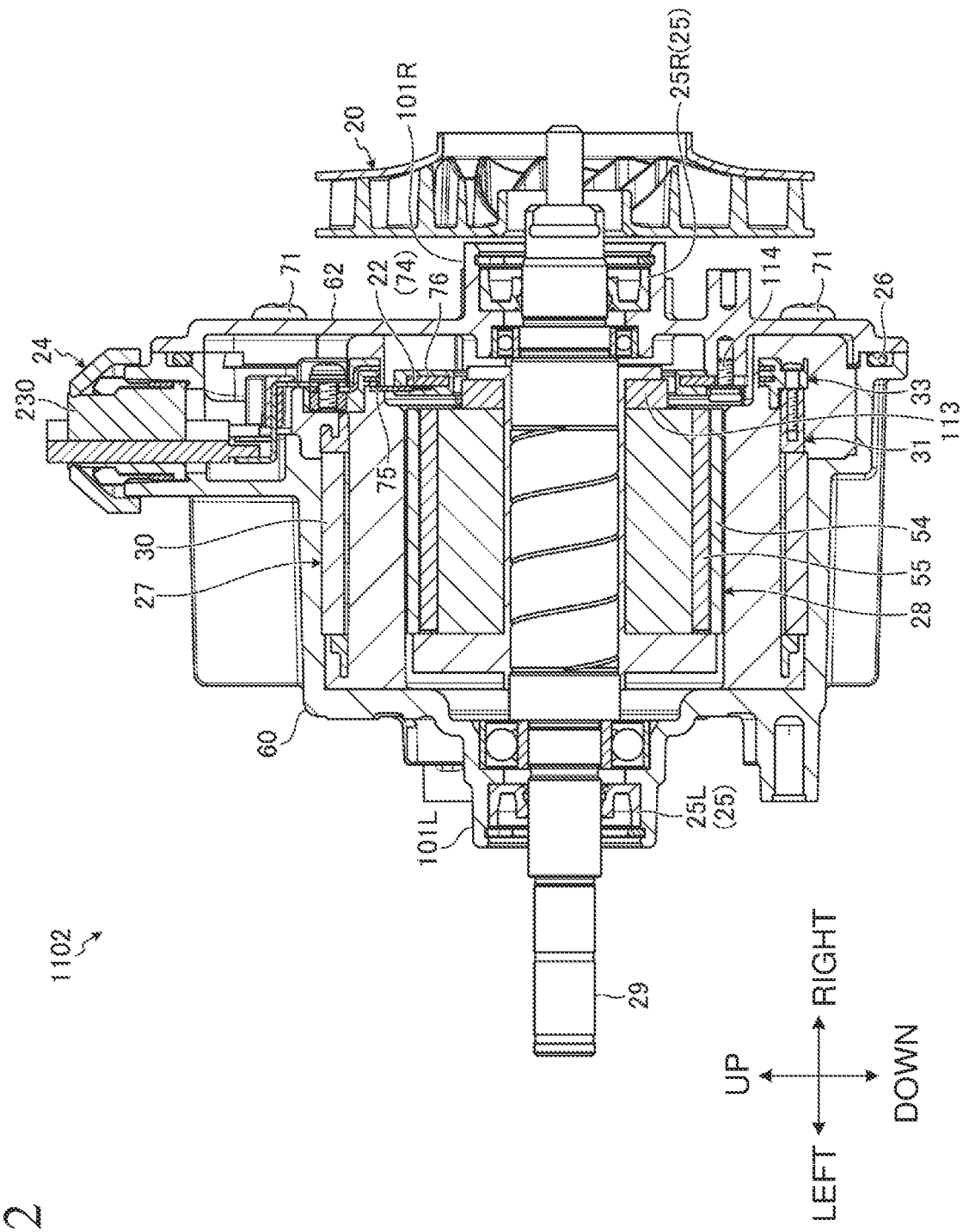
FIG. 22 is a longitudinal sectional view of a motor assembly in a third embodiment.
Figure 23:
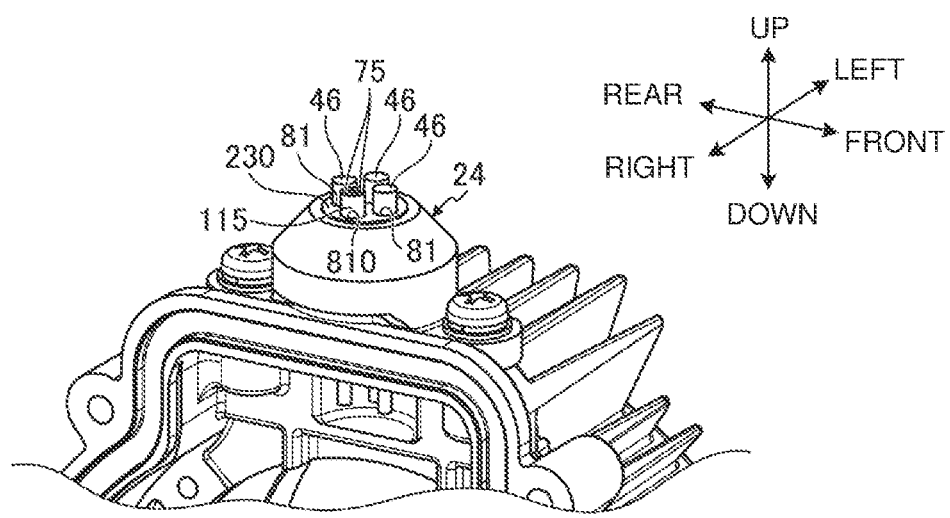
FIG. 23 is a perspective view of a first seal and a press assembly in the third embodiment.

FIG. 22 is a longitudinal sectional view of a motor assembly 1102 in the embodiment. FIG. 23 is a perspective view of a first seal 230 and the press assembly 24 in the embodiment.

In the above embodiments, the sensor board 22 is located outside the motor case 13. As shown in FIG. 22, the sensor board 22 may be located in the internal space 59 of the motor case 13. In the example shown in FIG. 22, the sensor board 22 surrounds a sleeve 113. The sleeve 113 surrounds the rotor shaft 29. The sensor board 22 is fastened to the lid 62 with screws 114.

As in the above embodiments, the sensor board 22 includes the magnetic sensors 74. The magnetic sensors 74 are located in the internal space 59 of the motor case 13. The magnetic sensors 74 in the embodiment detect the rotation magnets 55. The rotation magnets 55 are rotated by the rotor 28. The magnetic sensors 74 detect the rotation magnets 55 to detect rotation of the rotor 28. The rotation magnets 55 in the embodiment function as sensor magnets. Sensor magnets different from the rotation magnets 55 may be fixed to the rotor 28. The magnetic sensors 74 may detect the sensor magnets rotated by the rotor 28 to detect rotation of the rotor 28.

As shown in FIG. 23, the first seal 230 has the holes 81 to receive the power lines 46 and a hole 810 to receive the signal lines 75. The signal lines 75 are lead wires that are connected to the magnetic sensors 74 through the sensor board 22.

Figure 24:
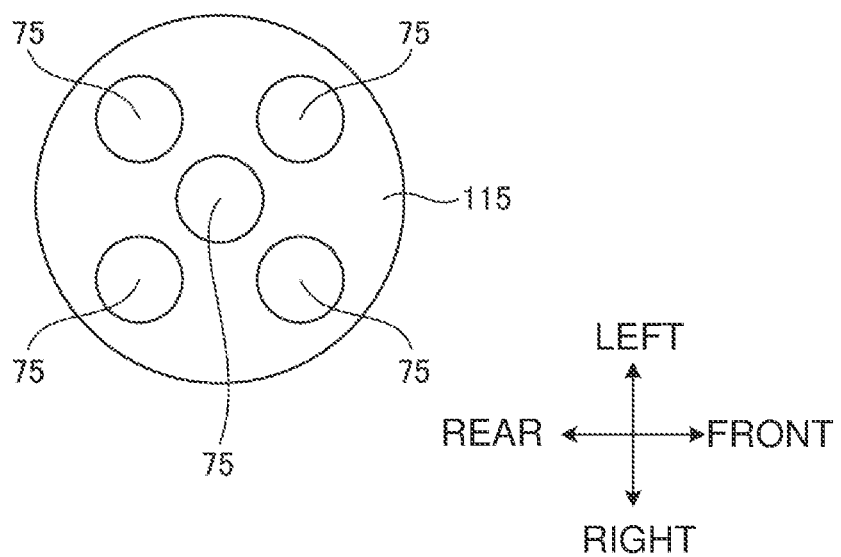
FIG. 24 is a diagram showing signal lines supported by the first seal in the third embodiment.

FIG. 24 is a diagram showing the signal lines 75 supported by the first seal 230 in the embodiment. As shown in FIG. 24, the five signal lines 75 are bundled together with a tube 115. The tube 115 is received in the hole 810. The tube 115 is, for example, a heat shrink tube. The outer surface of the tube 115 and the inner surface of the hole 810 are in close contact with each other.

As described above, the first seal 230 in the embodiment may seal between the motor case 13 and each signal line 75 being a lead wire connected to the corresponding magnetic sensor 74.

Fourth Embodiment

A fourth embodiment will now be described. The same or corresponding components as those in the above embodiments are given the same reference numerals herein and will be described briefly or will not be described.

Figure 25:
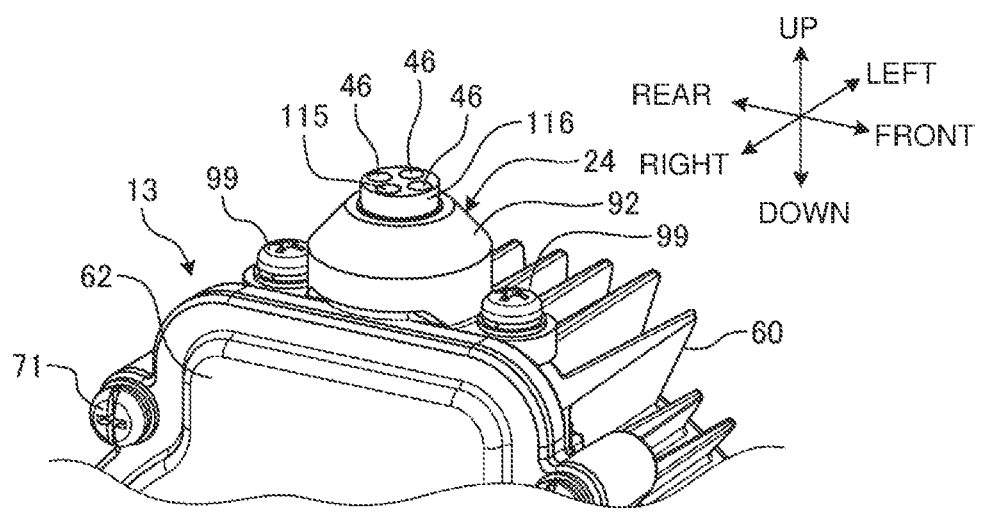
FIG. 25 is a perspective view of a first seal and a press assembly in a fourth embodiment.
Figure 26:
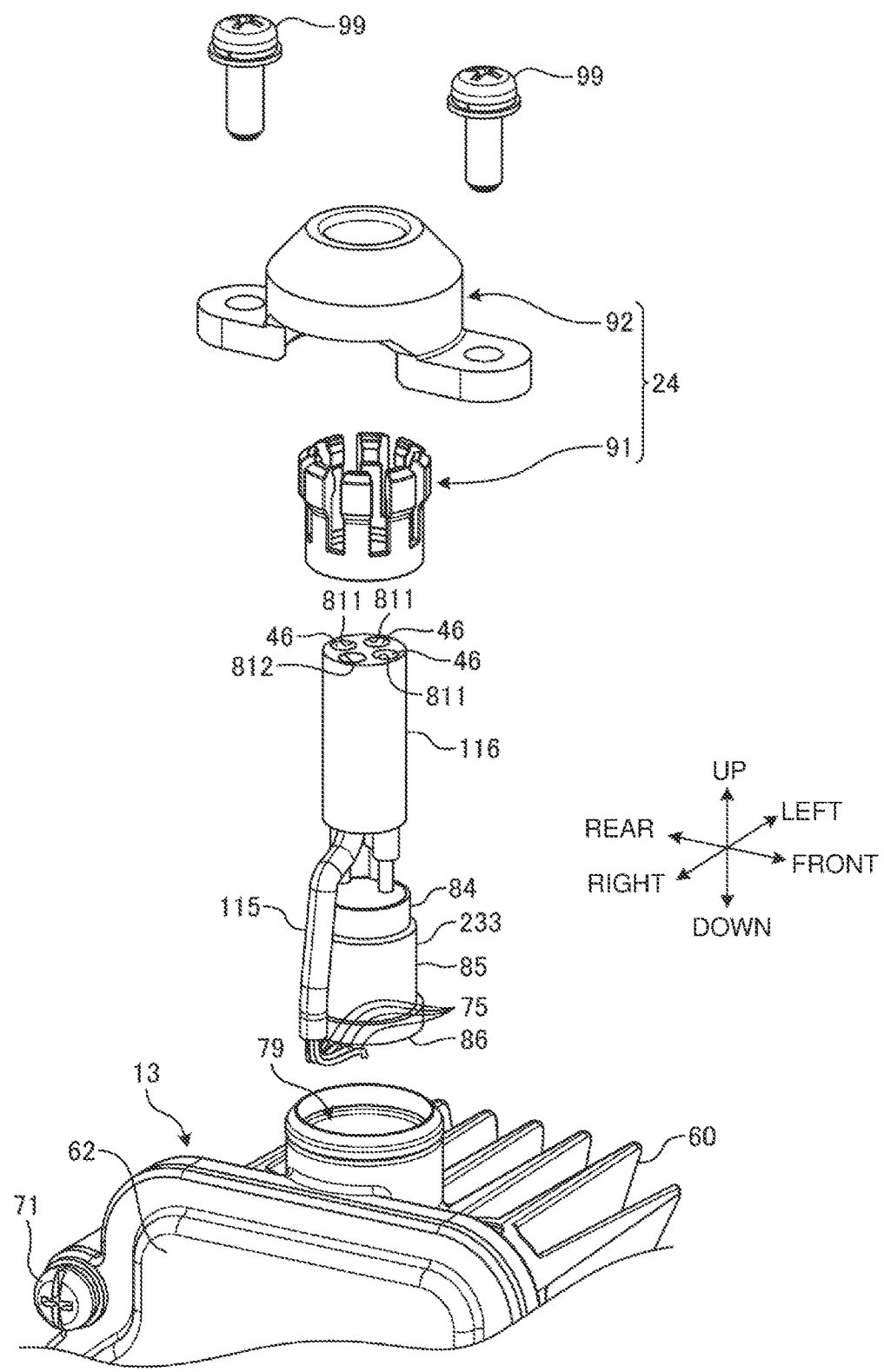
FIG. 26 is an exploded perspective view of the first seal and the press assembly in the fourth embodiment.
Figure 27:
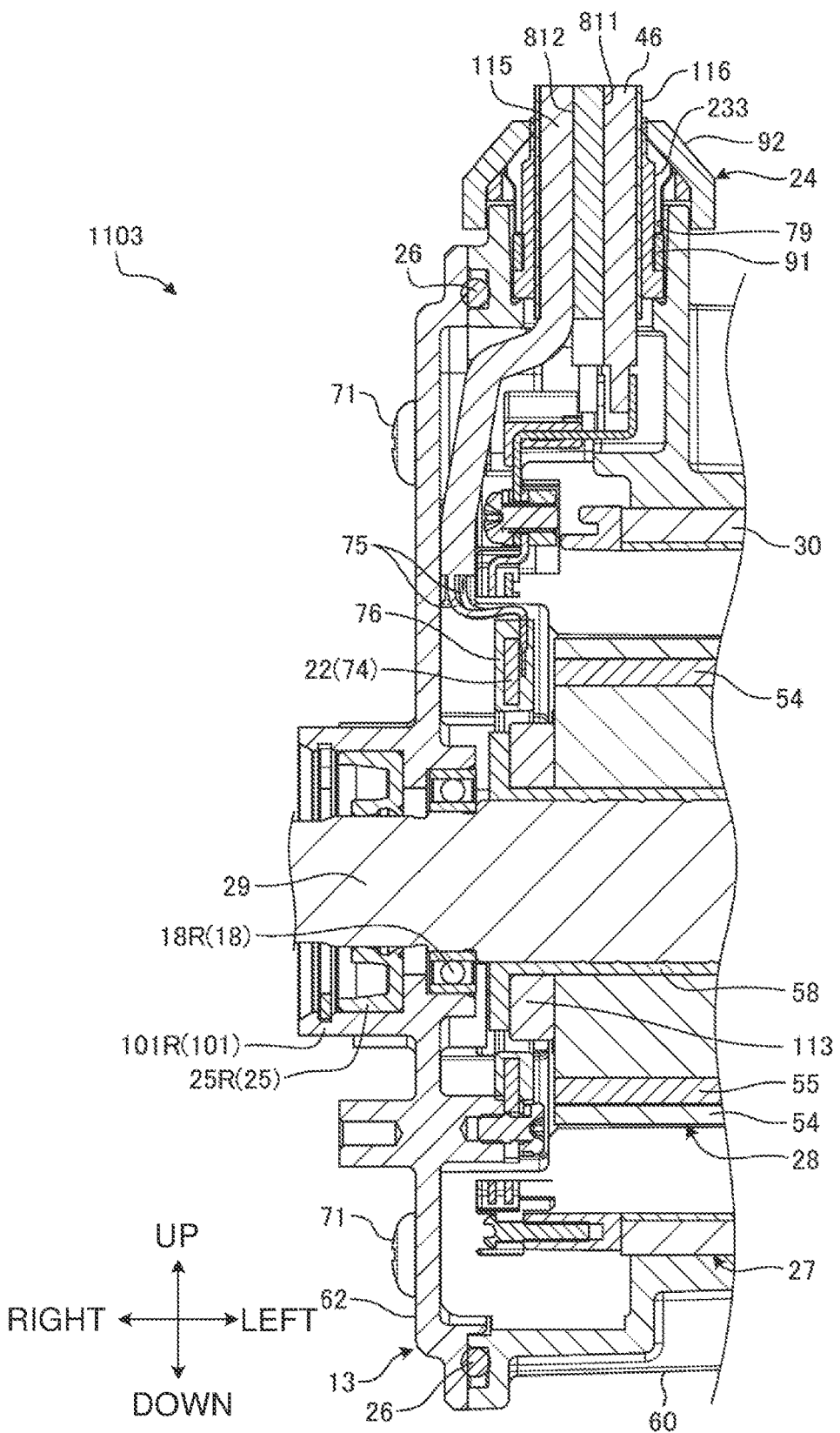
FIG. 27 is a longitudinal sectional view of a motor assembly in the fourth embodiment.

FIG. 25 is a perspective view of a first seal 233 and the press assembly 24 in the embodiment. FIG. 26 is an exploded perspective view of the first seal 233 and the press assembly 24 in the embodiment. FIG. 27 is a longitudinal sectional view of a motor assembly 1103 in the embodiment.

In the motor assembly 1103, the sensor board 22 including the magnetic sensors 74 is located in the internal space of the motor case 13, as in the third embodiment described above. The motor case 13 has the wiring passage 79 connecting the internal space and the external space of the motor case 13.

The motor assembly 1103 includes, as lead wires, the three power lines 46 and the five signal lines 75. As in the above embodiments, the power lines 46 are connected to the coils 32. The signal lines 75 are connected to the magnetic sensors 74 on the sensor board 22 located in the internal space of the motor case 13. As described with reference to FIG. 24, the five signal lines 75 are integrally bundled by the tube 115.

The three power lines 46 and the single tube 115 are integrally bundled by a collective tube 116 (sheath). The collective tube 116 is an electrically insulating member. The collective tube 116 is, for example, formed from rubber. The collective tube 116 is substantially cylindrical. The three power lines 46, the single tube 115, and the collective tube 116 form a cabtire cable.

The collective tube 116 has holes 811 and a hole 812. Each hole 811 receives the corresponding power line 46. The hole 812 receives the tube 115. The holes 811 and the hole 812 extend through the upper and lower surfaces of the collective tube 116. The collective tube 116 has three holes 811 parallel to one another. The collective tube 116 has the single hole 812. The holes 811 and the hole 812 are parallel to one another. The outer surface of each power line 46 and the inner surface of the corresponding hole 811 are in close contact with each other. The outer surface of the tube 115 and the inner surface of the hole 812 are in close contact with each other.

Each hole 811 and the hole 812 may have the same inner diameter or different inner diameters.

The first seal 233 is cylindrical. The first seal 233 is formed from rubber. The first seal 233 surrounds the collective tube 116 located inside the first seal 233.

The first seal 233 and the collective tube 116 are located in the wiring passage 79. The first seal 233 seals between the collective tube 116 and the motor case 13. As the first seal 23 described in the above embodiment, the first seal 233 includes the first portion 84, the second portion 85, and the third portion 86. The second portion 85 is located below the first portion 84. The third portion 86 is located below the second portion 85. The second portion 85 has a larger diameter than the first portion 84. The third portion 86 has a larger diameter than the second portion 85. The first portion 84 and the second portion 85 have a step between them. The second portion 85 and the third portion 86 have a step between them.

The press assembly 24 has the same structure as the press assembly 24 described in the above embodiments. As in the above embodiments, the press assembly 24 includes the press member 91 and the cover 92. The cover 92 is fastened to the motor case 13 with the screws 99.

The press assembly 24 applies pressure to the first seal 233 and the collective tube 116 that are located in the wiring passage 79. The press assembly 24 compresses the first seal 233 to cause the outer surface of each power line 46 and the inner surface of the corresponding hole 811 in the collective tube 116 to be in close contact with each other. The press assembly 24 compresses the first seal 233 to cause the outer surface of the tube 115 and the inner surface of the hole 812 in the collective tube 116 to be in close contact with each other.

The first seal 233 includes a lower surface that is a contact portion in contact with the protrusion 89 (refer to, for example, FIG. 17) on the motor case 13 in the wiring passage 79. The press assembly 24 presses the first seal 233 against the protrusion 89 to cause the lower surface of the first seal 233 and the protrusion 89 on the motor case 13 to be in close contact with each other.

The outer surface of each power line 46 and the inner surface of the corresponding hole 811 in the collective tube 116 being in close contact with each other seal between each power line 46 and the collective tube 116. The outer surface of the tube 115 and the inner surface of the hole 812 in the collective tube 116 being in close contact with each other seal between each signal line 75 and the collective tube 116. The first seal 233 and the cylindrical portion 60D being in close contact with each other seal between the first seal 233 and the motor case 13. Thus, the collective tube 116 and the first seal 233 seal between each power line 46 and the motor case 13 and seal between each signal line 75 and the motor case 13.

Fifth Embodiment

A fifth embodiment will now be described. The same or corresponding components as those in the above embodiments are given the same reference numerals herein and will be described briefly or will not be described.

Figure 28:
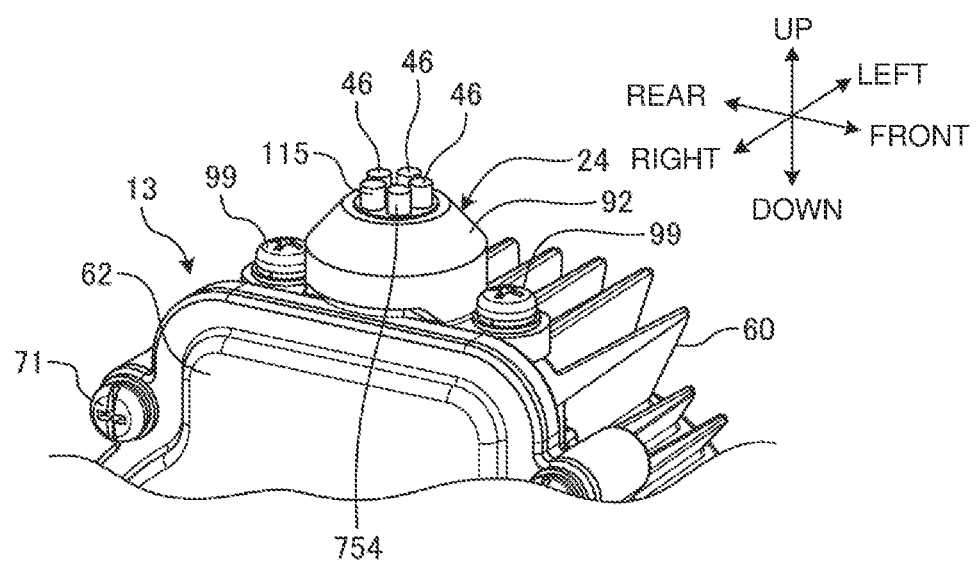
FIG. 28 is a perspective view of a first seal and a press assembly in a fifth embodiment.
Figure 29:
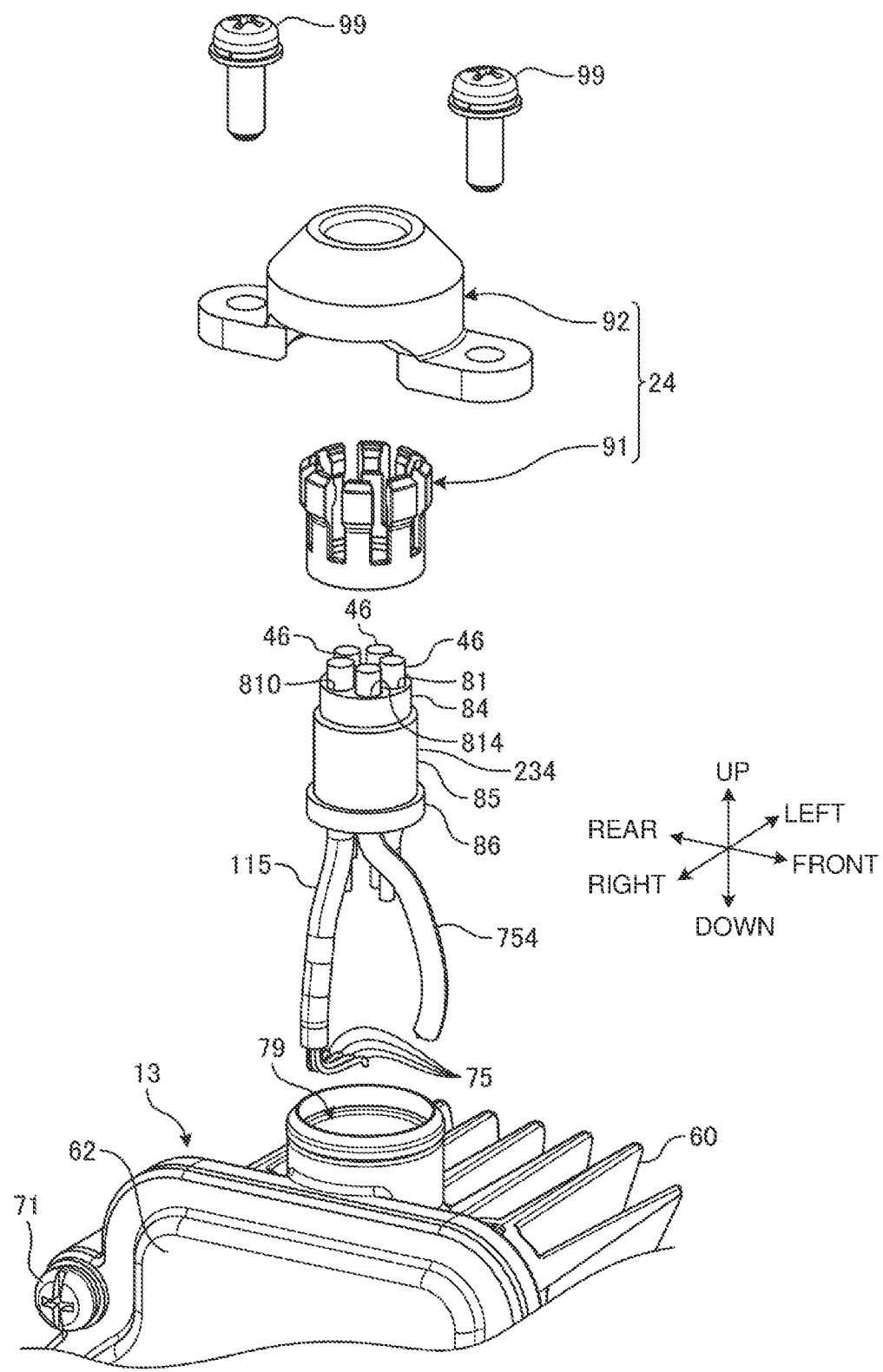
FIG. 29 is an exploded perspective view of the first seal and the press assembly in the fifth embodiment.
Figure 30:
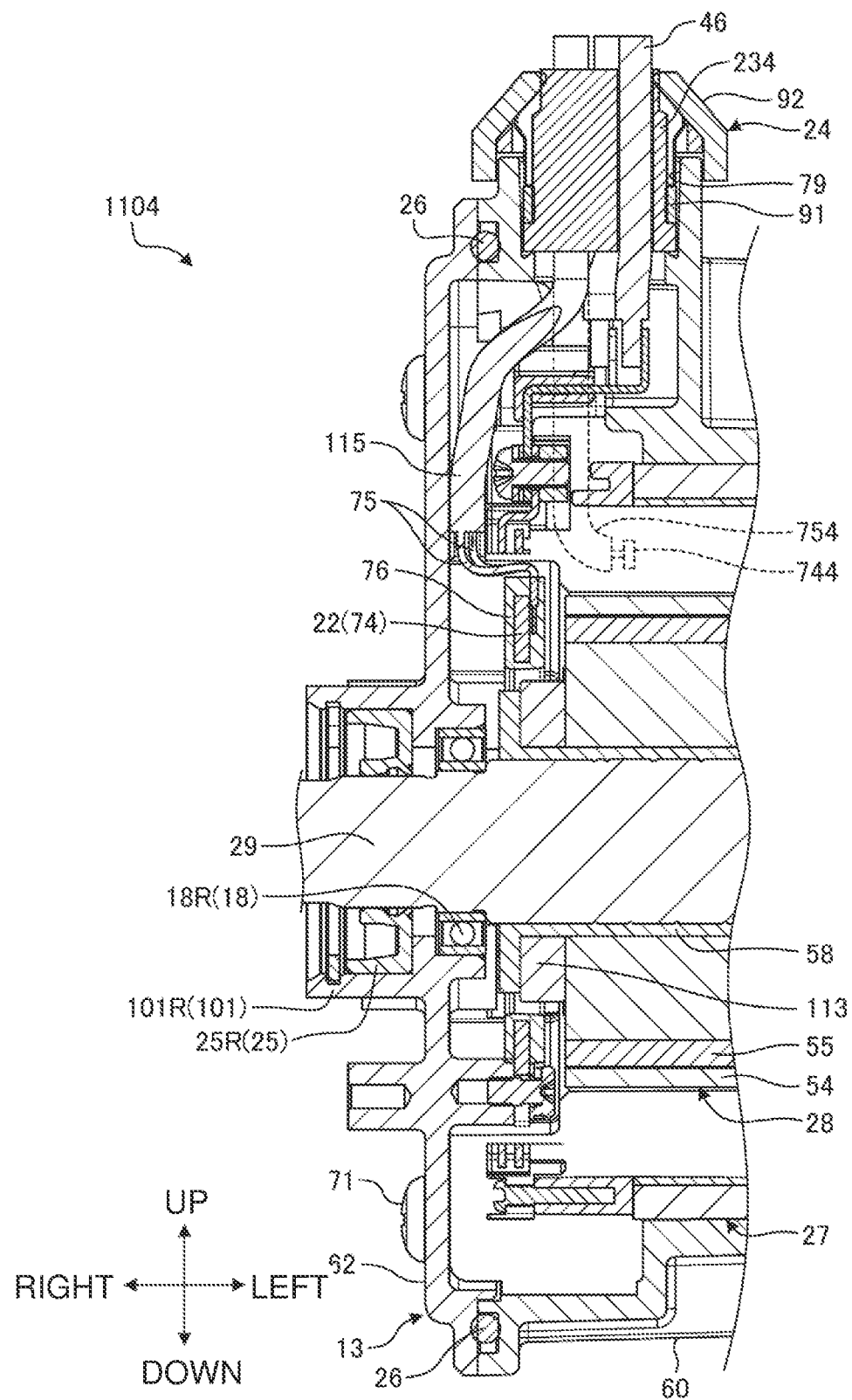
FIG. 30 is a longitudinal sectional view of a motor assembly in the fifth embodiment.

FIG. 28 is a perspective view of a first seal 234 and the press assembly 24 in the embodiment. FIG. 29 is an exploded perspective view of the first seal 234 and the press assembly 24 in the embodiment. FIG. 30 is a longitudinal sectional view of a motor assembly 1104 in the embodiment.

In the motor assembly 1104, the sensor board 22 including the magnetic sensors 74 is located in the internal space of the motor case 13, as in the third embodiment described above.

The motor case 13 has the wiring passage 79 connecting the internal space and the external space of the motor case 13.

The motor assembly 1104 includes, as lead wires, the three power lines 46, the five signal lines 75, and two signal lines 754. As in the above embodiments, the power lines 46 are connected to the coils 32. The signal lines 75 are connected to the magnetic sensors 74 on the sensor board 22 located in the internal space of the motor case 13. As described with reference to FIG. 24, the five signal lines 75 are integrally bundled by the tube 115. The signal lines 754 are connected to a temperature sensor 744 located in the internal space of the motor case 13.

The temperature sensor 744 detects the temperature of at least a portion of the motor 12. For example, the temperature sensor 744 detects the temperature of at least a portion of the stator 27. The temperature sensor 744 may detect the temperature of the coils 32. The temperature sensor 744 may be located at the inner circumference of one of the coils 32. The temperature sensor 744 may be located, for example, between one of the coils 32 and the corresponding tooth cover 36. The temperature sensor 744 may be located, for example, on the right end of the tooth cover 36.

The first seal 234 is substantially cylindrical. The first seal 234 is formed from rubber. The first seal 234 has the holes 81, the hole 810, and a hole 814. Each hole 81 receives the corresponding power line 46. The hole 810 receives the tube 115 including the signal lines 75. The hole 814 receives the signal lines 754.

Each hole 81, the hole 810, and the hole 814 may have the same inner diameter or different inner diameters.

The holes 81, the hole 810, and the hole 814 extend through the upper and lower surfaces of the first seal 234. The first seal 234 has three holes 81 that are parallel to one another. The first seal 234 has the single hole 810. The first seal 234 has the single hole 814. The holes 81, the hole 810, and the hole 814 are parallel to one another. The outer surface of each power line 46 and the inner surface of the corresponding hole 81 are in close contact with each other. The outer surface of the tube 115 and the inner surface of the hole 810 are in close contact with each other. The outer surface of each signal line 754 and the inner surface of the hole 814 are in close contact with each other.

The power lines 46, the tube 115 including the signal lines 75, and the signal lines 754 are held by the first seal 234 and located in the wiring passage 79. The first seal 234 seals between each power line 46 and the motor case 13. The first seal 234 seals between the tube 115 and the motor case 13. The first seal 234 seals between each signal line 754 and the motor case 13.

As the first seal 23 described in the above embodiment, the first seal 234 includes the first portion 84, the second portion 85, and the third portion 86. The second portion 85 is located below the first portion 84. The third portion 86 is located below the second portion 85. The second portion 85 has a larger diameter than the first portion 84. The third portion 86 has a larger diameter than the second portion 85. The first portion 84 and the second portion 85 have a step between them. The second portion 85 and the third portion 86 have a step between them.

The press assembly 24 has the same structure as the press assembly 24 described in the above embodiments. As in the above embodiments, the press assembly 24 includes the press member 91 and the cover 92. The fastening portions 96 on the cover 92 are fastened to the motor case 13 with the screws 99.

The press assembly 24 applies pressure to the first seal 234 located in the wiring passage 79. The press assembly 24 compresses the first seal 234 to cause the outer surface of each power line 46 and the inner surface of the corresponding hole 81 to be in close contact with each other. The press assembly 24 compresses the first seal 234 to cause the outer surface of the tube 115 and the inner surface of the hole 810 to be in close contact with each other. The press assembly 24 compresses the first seal 234 to cause the outer surface of each signal line 754 and the inner surface of the hole 814 to be in close contact with each other. The first seal 234 includes a lower surface that is a contact portion in contact with the protrusion 89 (refer to, for example, FIG. 17) on the motor case 13 in the wiring passage 79. The press assembly 24 presses the first seal 234 against the protrusion 89 to cause the lower surface of the first seal 234 and the protrusion 89 on the motor case 13 to be in close contact with each other.

The outer surface of each power line 46 and the inner surface of the corresponding hole 81 being in close contact with each other seal between each power line 46 and the motor case 13. The outer surface of the tube 115 and the inner surface of the hole 810 being in close contact with each other seal between each signal line 75 and the motor case 13. The outer surface of each signal line 754 and the inner surface of the hole 814 being in close contact with each other seal between each signal line 754 and the motor case 13.

Other Embodiments

Although the motor 12 is an inner-rotor brushless motor in the above embodiments, the motor 12 may be an outer-rotor brushless motor. In the outer-rotor brushless motor, the teeth protrude radially outward from the annular yoke.

The electric work machine 1 according to the above embodiments is a chain saw, which is an example of outdoor power equipment. The outdoor power equipment may not be a chain saw. Examples of the outdoor power equipment include a hedge trimmer, a lawn mower, a mowing machine, and a blower. The electric work machine 1 may be, for example, a power tool. Examples of the power tool include a driver drill, a vibration driver drill, an angle drill, an impact driver, a grinder, a hammer, a hammer drill, a circular saw, and a reciprocating saw.

In the above embodiments, the electric work machine is powered by the battery pack 17 attached to the battery mount. In some embodiments, the electric work machine may use utility power (alternating-current power supply).

REFERENCE SIGNS LIST 1 electric work machine
2 housing
3 front grip
4 hand guard
5 battery mount
6 controller
7 trigger lock lever
8 trigger switch
9 guide bar
10 saw chain (output unit)
11 motor assembly
12 motor
13 motor case
14 motor compartment
15 battery holder
16 rear grip
17 battery pack
18 bearing
18L left bearing
18R right bearing
19 heat transfer resin portion
20 cooling fan
20A inlet
20B first plate
20C opening
20D second plate
20E blade
20F outlet
21 sensor magnet
22 sensor board 22A notch
22B hole
23 first seal
24 press assembly
25 second seal
25L second seal
25R second seal
26 third seal
26A arc
26B rectangular portion
27 stator
28 rotor
29 rotor shaft
30 stator core
31 insulator
32 coil
33 busbar unit
34 yoke
35 tooth
36 tooth cover
37 coil stop
38 peripheral wall
38L peripheral wall
38R peripheral wall
39 wire support
39A inner protrusion
39B outer protrusion
40 screw boss
41 wire
42 external terminal
42U external terminal
42V external terminal
42W external terminal
43 fusing terminal
43U fusing terminal
43V fusing terminal
43W fusing terminal
44 short-circuiting member
44U short-circuiting member
44V short-circuiting member
44W short-circuiting member
45 insulating member
46 power line
46U power line
46V power line
46W power line
47 connector terminal
47U connector terminal
47V connector terminal
47W connector terminal
48 base
49 screw boss
50 connector
51 recess
52 screw
53 screw
54 rotor core
55 rotation magnet
56 magnet slot
57 hollow portion
58 cylindrical member
59 internal space
59A circular space
59B extended space
60 body
60A cylindrical portion
60B extension
60C wall
60D cylindrical portion
61 heat-radiating fin
62 lid
62A disk
62B extension
62D screw boss
62E positioning pin
63 insertion hole
64 support surface
65 threaded hole
66 washer
67 screw
68 ridge
69 screw boss
70 screw boss
71 screw
72 shaft hole
72L shaft hole
72R shaft hole
73 fan bush
73A disk
73B cylindrical portion
73C support hole
73D magnet slot
74 magnetic sensor
75 signal line
76 resin film
77 electronic component
78 screw
79 wiring passage
80 insertion end opening
81 hole
82 upper surface
83 lower surface (contact portion)
84 first portion
85 second portion
86 third portion
87 tapered surface
88 support surface
89 protrusion
91 press member
92 cover
93 ring
94 tab
94A elastic deformable portion
94B head
94C corner
95 peripheral wall
96 fastening portion
96A opening
97 opening
98 inner surface
99 screw
100 threaded hole
101 peripheral wall
101L peripheral wall
101R peripheral wall
102L rib
102R rib
103 lip
104 outer circumferential portion
105 connector
106 spring
107 metal ring
108L stopper
108R stopper 109 recess
110 inner peripheral wall
111 outer peripheral wall
112 rib
113 sleeve
114 screw
115 tube
116 tube
230 first seal
233 first seal
234 first seal
744 temperature sensor
754 signal line
810 hole
811 hole
812 hole
814 hole
1101 motor assembly
1102 motor assembly
1103 motor assembly
1104 motor assembly

What is claimed is:

1. An electric work machine, comprising:
   a brushless motor including
     a stator,
     a rotor rotatable with respect to the stator, and
     a rotor shaft fixed to the rotor;
   an output unit drivable by the rotor shaft;
   a motor case including a protrusion, an internal space, and a wiring passage, the internal space accommodating the stator and the rotor;
   a lead wire located in the wiring passage connecting the internal space and an external space of the motor case; and
   a first seal sealing between the lead wire and the motor case, and including a contact portion in contact with the protrusion in the wiring passage.

2. The electric work machine according to claim 1, wherein
   the stator includes
     a stator core,
     an insulator covering at least a part of a surface of the stator core, and
     a coil on the insulator, and
   the lead wire is connected to the coil.

3. The electric work machine according to claim 1, further comprising:
   a sensor magnet located in the internal space and rotatable by the rotor; and
   a magnetic sensor located in the internal space and configured to detect the sensor magnet,
   wherein the lead wire is connected to the magnetic sensor.

4. The electric work machine according to claim 1, wherein
   the first seal is received in the wiring passage.

5. The electric work machine according to claim 1, wherein
   the first seal includes a hole receiving the lead wire.

6. The electric work machine according to claim 5, wherein
   the wiring passage has an insertion end opening facing the external space, and
   the first seal is placed in the wiring passage through the insertion end opening and causes the contact portion to be in contact with the protrusion.

7. The electric work machine according to claim 5, further comprising:
   a press assembly configured to compress the first seal to cause an outer surface of the lead wire and an inner surface of the hole to be in close contact with each other, and press the first seal against the protrusion to cause the contact portion and the protrusion to be in close contact with each other.

8. The electric work machine according to claim 7, wherein
   the press assembly includes
     a press member including a ring surrounding the first seal and a plurality of tabs connected to the ring, and
     a cover fixed to the motor case and in contact with the press member.

9. The electric work machine according to claim 8, wherein
   the plurality of tabs in contact with the cover elastically deform inward in a radial direction of the ring and compresses the first seal.

10. The electric work machine according to claim 8, wherein
    the first seal includes a support surface in contact with the ring, and
    the plurality of tabs and the cover in contact with each other cause the ring to move in an axial direction of the ring and press the first seal against the protrusion.

11. The electric work machine according to claim 8, wherein
    the cover includes
      a peripheral wall surrounding the plurality of tabs, and
      a fastening portion fixed to the motor case.

12. The electric work machine according to claim 1, wherein
    the rotor shaft is at least partially received in a shaft hole connecting the internal space and the external space, and
    the electric work machine further comprises a second seal sealing between the rotor shaft and the motor case.

13. The electric work machine according to claim 12, wherein
    the motor case includes a peripheral wall surrounding and supporting the second seal.

14. The electric work machine according to claim 13, wherein
    the second seal is press-fitted between the rotor shaft and the peripheral wall.

15. The electric work machine according to claim 1, wherein
    the motor case includes
      a body having an insertion hole receiving the stator, and
      a lid covering the insertion hole and defining the internal space with the body, and
    the electric work machine further comprises a third seal sealing between the body and the lid.

16. An electric work machine, comprising:
    a brushless motor including
      a stator,
      a rotor rotatable with respect to the stator, and
      a rotor shaft fixed to the rotor;
    an output unit drivable by the rotor shaft;
    a motor case including a protrusion, an internal space, and a wiring passage, the internal space accommodating the stator and the rotor;
    a collective tube located in the wiring passage connecting the internal space and an external space of the motor case, the collective tube integrally bundling a plurality of lead wires;

a first seal sealing between the collective tube and the motor case, and surrounding the collective tube, the first seal including a contact portion in contact with the protrusion in the wiring passage; and a press assembly configured to:
compress the first seal to cause the plurality of lead wires and the collective tube to be in close contact with each other, and
press the first seal against the protrusion to cause the contact portion and the protrusion to be in close contact with each other.

17. An electric work machine, comprising:
a brushless motor including
a stator,
a rotor rotatable with respect to the stator, and
a rotor shaft fixed to the rotor;
an output unit drivable by the rotor shaft;
a motor case including a protrusion, an internal space, and a wiring passage, the internal space accommodating the stator and the rotor;
a sensor in the internal space;
a signal line connected to the sensor and located in the wiring passage connecting the internal space and an external space of the motor case; and
a first seal sealing between the signal line and the motor case, and including a contact portion in contact with the protrusion in the wiring passage.

18. The electric work machine according to claim 17, wherein
the first seal includes a hole receiving the signal line, and
the electric work machine further comprises a press assembly configured to:
compress the first seal to cause an outer surface of the signal line and an inner surface of the hole to be in close contact with each other, and
press the first seal against the protrusion to cause the contact portion and the protrusion to be in close contact with each other.

19. The electric work machine according to claim 17, further comprising:
a power line connected to a coil in the stator and located in the wiring passage,
wherein the first seal seals between the power line and the motor case.

20. An electric work machine, comprising:
a brushless motor including
a stator,
a rotor rotatable with respect to the stator, the rotor including a rotor core, and
a rotor shaft fixed to the rotor;
an output unit drivable by the rotor shaft;
a motor case including an internal space and a wiring passage, the internal space accommodating the stator and the rotor;
a lead wire located in the wiring passage connecting the internal space and an external space of the motor case;
a first seal configured to be elastically deformed to seal between the lead wire and the motor case;
a second seal configured to be elastically deformed to seal between the rotor shaft and the motor case; and
a bearing rotatably supporting the rotor shaft between the rotor core and the second seal,
wherein the rotor shaft is at least partially received in a shaft hole connecting the internal space and the external space.

21. The electric work machine according to claim 20, further comprising:
a stopper disposed axially outside of the second seal.

22. The electric work machine according to claim 20, wherein
the second seal includes a lip comprising a spring inside to generate an elastic force for tightening the rotor shaft.

* * * * *